(12) United States Patent
Miyoshi

(10) Patent No.: US 12,083,862 B2
(45) Date of Patent: Sep. 10, 2024

(54) VEHICLE-MOUNTED TEMPERATURE CONTROL SYSTEM

(71) Applicant: TOYOTA JIDOSHA KABUSHIKI KAISHA, Toyota (JP)

(72) Inventor: Yuji Miyoshi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/207,329

(22) Filed: Jun. 8, 2023

(65) Prior Publication Data

US 2023/0311618 A1    Oct. 5, 2023

Related U.S. Application Data

(63) Continuation of application No. 17/168,307, filed on Feb. 5, 2021, now Pat. No. 11,724,570.

(30) Foreign Application Priority Data

Mar. 10, 2020   (JP) ................. 2020-041142

(51) Int. Cl.
*B60H 1/03*       (2006.01)
*B60H 1/00*       (2006.01)
(Continued)

(52) U.S. Cl.
CPC ........... *B60H 1/03* (2013.01); *B60H 1/00021* (2013.01); *B60H 1/00335* (2013.01);
(Continued)

(58) Field of Classification Search
None
See application file for complete search history.

(56) References Cited

U.S. PATENT DOCUMENTS

| 3,309,020 A | * | 3/1967 | Cobley | ................... B60H 1/06 237/12.3 B |
| 6,394,210 B2 | | 5/2002 | Matsuda et al. | |

(Continued)

FOREIGN PATENT DOCUMENTS

| CN | 1278113 A | 12/2000 |
| CN | 104364103 A | 2/2015 |

(Continued)

OTHER PUBLICATIONS

May 20, 2022 Office Action issued in U.S. Appl. No. 17/168,307.

(Continued)

*Primary Examiner* — Jenna M Maroney
(74) *Attorney, Agent, or Firm* — Oliff PLC

(57) ABSTRACT

A temperature control system includes a heater core utilizing heat of a heat medium; an engine heat exchanger utilizing exhaust heat of an engine to heat the heat medium; a condenser utilizing heat other than the exhaust heat to heat the heat medium; a heat circuit having the heater core and condenser; a communication flow path making the engine heat exchanger communicate with the heat circuit; and a connection state switching mechanism switching a flow state of the heat medium, between a first state and a second state. In the first state, the heat medium flows through the heat circuit, while flowing through the heater core, and in the second state, the heat medium flows through the heat circuit without flowing through the heater core. The heat circuit is arranged at a front of a passenger compartment, and the engine heat exchanger is arranged at a rear of the compartment.

8 Claims, 16 Drawing Sheets

(51) Int. Cl.
  *B60H 1/04* (2006.01)
  *B60H 1/14* (2006.01)
  *B60H 1/32* (2006.01)
  *F01N 5/02* (2006.01)

(52) U.S. Cl.
  CPC ......... *B60H 1/004* (2013.01); *B60H 1/00885* (2013.01); *B60H 1/00899* (2013.01); *B60H 1/04* (2013.01); *B60H 1/3205* (2013.01); *B60H 1/3227* (2013.01); *B60H 1/32284* (2019.05); *F01N 5/02* (2013.01); *B60H 2001/00178* (2013.01); *B60H 2001/00214* (2013.01); *B60H 2001/00242* (2013.01); *B60H 2001/00928* (2013.01); *B60H 1/143* (2013.01); *B60H 2001/3255* (2013.01)

(56) References Cited

U.S. PATENT DOCUMENTS

| | | |
|---|---|---|
| 7,240,748 B2 | 7/2007 | Kira et al. |
| 7,455,136 B2 | 11/2008 | Pleune et al. |
| 11,241,930 B2 | 2/2022 | Aikawa et al. |
| 2001/0040061 A1 | 11/2001 | Matuda et al. |
| 2003/0164001 A1 | 9/2003 | Vouzelaud et al. |
| 2005/0039878 A1 | 2/2005 | Meyer et al. |
| 2009/0205353 A1 | 8/2009 | Takahashi |
| 2010/0281901 A1 | 11/2010 | Kawase et al. |
| 2011/0174000 A1 | 7/2011 | Richter et al. |
| 2015/0210141 A1 | 7/2015 | Ragazzi |
| 2016/0082805 A1 | 3/2016 | Graaf et al. |
| 2017/0182866 A1 | 6/2017 | Onishi et al. |
| 2017/0197490 A1 | 7/2017 | Enomoto et al. |
| 2018/0251011 A1 | 9/2018 | Sugimura et al. |
| 2018/0259240 A1 | 9/2018 | Onishi et al. |
| 2018/0339574 A1 | 11/2018 | Sugimura et al. |
| 2018/0354344 A1 | 12/2018 | Miura et al. |
| 2019/0047363 A1 | 2/2019 | Sonnekalb et al. |
| 2019/0078497 A1 | 3/2019 | Enomoto et al. |
| 2019/0176563 A1 | 6/2019 | Kim |
| 2019/0359030 A1 | 11/2019 | Kim et al. |
| 2020/0079177 A1 | 3/2020 | Ferraris et al. |
| 2020/0164720 A1 | 5/2020 | Hotzel et al. |
| 2020/0317026 A1 | 10/2020 | Kitamura et al. |
| 2020/0324611 A1 | 10/2020 | Yano et al. |
| 2021/0001686 A1 | 1/2021 | Kim et al. |
| 2021/0008951 A1 | 1/2021 | Aikawa et al. |
| 2021/0094390 A1 | 4/2021 | Aikawa |
| 2021/0094443 A1 | 4/2021 | Aikawa |
| 2021/0237533 A1 | 8/2021 | Shimauchi |
| 2021/0283984 A1 | 9/2021 | Miyoshi |
| 2021/0300144 A1 | 9/2021 | Kawabe et al. |
| 2021/0387506 A1 | 12/2021 | Miyoshi |

FOREIGN PATENT DOCUMENTS

| | | | |
|---|---|---|---|
| CN | 102548780 B | 4/2016 | |
| DE | 11 2016 004 004 T5 | 5/2018 | |
| DE | 102020112360 A1 | 11/2020 | |
| DE | 102021105464 A1 | 9/2021 | |
| EP | 2088013 A1 | 8/2009 | |
| JP | 2000-043545 A | 2/2000 | |
| JP | 2001-146112 A | 5/2001 | |
| JP | 2007-182857 A | 7/2007 | |
| JP | 2008-126969 A | 6/2008 | |
| JP | 2009-180103 A | 8/2009 | |
| JP | 2014-020280 A | 2/2014 | |
| JP | 6015184 B2 | 10/2016 | |
| JP | 2017065653 A * | 4/2017 | ......... B60H 1/00885 |
| JP | 2019026111 A | 2/2019 | |
| JP | 2020168950 A | 10/2020 | |
| JP | 2020185829 A | 11/2020 | |
| JP | 2021054278 A | 4/2021 | |
| JP | 2021059152 A | 4/2021 | |
| JP | 2021142793 A | 9/2021 | |
| JP | 2021142794 A | 9/2021 | |
| WO | 2014/013670 A1 | 1/2014 | |
| WO | 2015194107 A1 | 12/2015 | |
| WO | 2017038677 A1 | 3/2017 | |
| WO | 2017130846 A1 | 8/2017 | |
| WO | 2017145638 A1 | 8/2017 | |
| WO | 2019026528 A1 | 2/2019 | |
| WO | 2019031131 A1 | 2/2019 | |
| WO | 2019058838 A1 | 3/2019 | |
| WO | 2020203150 A1 | 10/2020 | |
| WO | 2020213536 A1 | 10/2020 | |

OTHER PUBLICATIONS

WO-2017130846-A1 English Machine Translation (Year: 2017).
JP-6015184-B2 English machine translation (Year: 2016).
Nov. 18, 2022 Office Action issued in U.S. Appl. No. 17/168,307.

* cited by examiner

VEHICLE-MOUNTED TEMPERATURE CONTROL SYSTEM

CROSS-REFERENCE TO RELATED APPLICATION(S)

This application is a continuation of U.S. application Ser. No. 17/168,307 filed Feb. 5, 2021, which claims the benefit of Japanese Patent Application No. 2020-041142 filed on Mar. 10, 2020. The disclosure of the prior applications is hereby incorporated by reference herein in its entirety.

FIELD

The present disclosure relates to a vehicle-mounted temperature control system.

BACKGROUND

Known in the art is a vehicle-mounted temperature control system using a heater core provided in a heat circuit of a vehicle for heating the inside of a passenger compartment. In particular, in such a vehicle-mounted temperature control system, it is known to heat a heat medium flowing into the heater core by the exhaust heat of the internal combustion engine and the heat discharged in a condenser of a refrigeration circuit provided separately from the internal combustion engine (for example, PTL 1).

CITATIONS LIST

Patent Literature

[PTL 1] Japanese Unexamined Patent Publication No. 2009-180103

SUMMARY

Technical Problem

In this regard, in the design of the vehicle, sometimes it is necessary to mount the internal combustion engine and the heater core away from each other. In this case, the piping for the heat medium between the internal combustion engine and the heater core is long. Therefore, if trying to make a heat medium warmed by the internal combustion engine flow into the heater core, the cold heat medium remaining inside the piping will first flow to the heater core. As a result, the heating capability by the heater core at this time is low.

In particular, if the heat discharged in the condenser of the refrigeration circuit can be used to heat the heat medium flowing into the heater core, it is possible to supply high temperature heat medium from the condenser to the heater core before the heat medium is warmed by the internal combustion engine. Therefore, although high temperature heat medium was supplied to the heater core for heating before utilizing the heat medium warmed by the internal combustion engine, if starting to utilize the heat medium flowing from the internal combustion engine, the cold heat medium temporarily flowed into the heater core. As a result, the heating capability temporarily falls.

In considering the above problem, an object of the present disclosure is to keep the flow of heat medium, which had remained in the piping for heat medium between the internal combustion engine and the heater core, through the heater core, from causing the heating capability by the heater core to become lower.

Solution to Problem

The gist of the present disclosure is as follows:
(1) A vehicle-mounted temperature control system comprising:
  a heater core used for utilizing heat of a heat medium to heat an inside of a passenger compartment;
  a first heating part utilizing exhaust heat of an internal combustion engine to heat the heat medium;
  a second heating part utilizing heat other than exhaust heat of the internal combustion engine to heat the heat medium;
  a heat circuit provided with the heater core and second heating part inside a flow path;
  a communication flow path making the first heating part communicate with the heat circuit;
  a connection state switching mechanism switching a flow state between the heater core and the first heating part and second heating part, between a first flow state and a second flow state; and
  a control device controlling the connection state switching mechanism, wherein
  in the first flow state, at least part of the heat medium heated by the first heating part flows through part of the heat circuit while flowing through the heater core;
  in the second flow state, at least part of the heat medium heated by the first heating part flows through part of the heat circuit without flowing through the heater core; and
  the heat circuit is arranged at a first side of the passenger compartment in a longitudinal direction of the vehicle and the first heating part is arranged at a second side at the opposite side from the first side in the longitudinal direction of the vehicle.
(2) The vehicle-mounted temperature control system according to (1), wherein a first side of the passenger compartment is a rear side of the passenger compartment, and a second side of the passenger compartment is a front side of the passenger compartment.
(3) The vehicle-mounted temperature control system according to (1) or (2), wherein the control device controls the connection state switching mechanism so as to switch the flow state of the heat medium to the second flow state and the first flow state in that order, when heating of the passenger compartment is demanded.
(4) The vehicle-mounted temperature control system according to any one of (1) to (3), wherein
  the connection state switching mechanism switches the flow state of the heat medium among the first flow state, the second flow state, and the third flow state; and
  in the third flow state, heat medium does not flow from the first heating part to the heat circuit and inside the heat circuit, the heat medium heated by the second heating part flows through the heater core.
(5) The vehicle-mounted temperature control system according to (4), wherein the direction in which the heat medium heated by the first heating part flows through the heat circuit when the flow state is the third flow state and the direction in which the heat medium heated by the first heating part flows through the heat circuit when the flow state is the second flow state are opposite.
(6) The vehicle-mounted temperature control system according to (4) or (5), further comprising an engine heat circuit configured so that at least part of the heat medium flowing out from the first heating part can again flow into the first heating part without flowing through the heat circuit, wherein in the third flow state, the heat medium heated by the first heating part flows through only the inside of the engine heat circuit.

(7) The vehicle-mounted temperature control system according to any one of (4) to (6), wherein the control device controls the connection state switching mechanism so as to switch the flow state of the heat medium to the third flow state, the second flow state, and the first flow state in that order when the heating of the passenger compartment is demanded.

(8) The vehicle-mounted temperature control system according to any one of (1) to (7), further comprising a refrigeration circuit, wherein the second heating part utilizes the heat of the condenser of the refrigeration circuit to heat the heat medium.

(9) The vehicle-mounted temperature control system according to any one of (1) to (8), wherein the heat circuit comprises a radiator provided alongside the heater core with respect to the second heating part and is configured to be able to adjust the flow rate of the heat medium flowing through the heater core and the radiator.

Advantageous Effects of Invention

According to the present disclosure, the flow of heat medium, which had remained in the piping for heat medium between the internal combustion engine and the heater core, through the heater core, is kept from causing the heating capability by the heater core to become lower.

DESCRIPTION OF EMBODIMENTS

Figure 1:
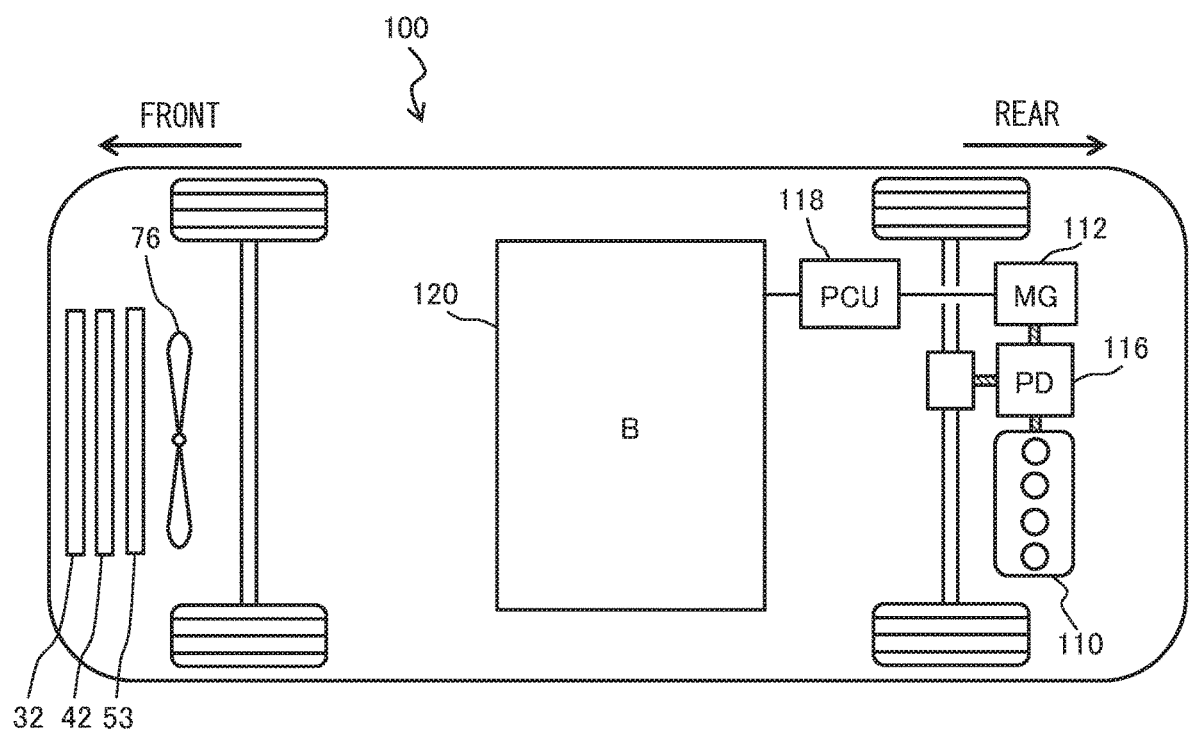
FIG. 1 is a view schematically showing the configuration of a vehicle mounting a vehicle-mounted temperature control system according to one embodiment.

Below, embodiments will be explained in detail referring to the drawings. Note that, in the following explanation, similar components are assigned the same reference notations.

Configuration of Vehicle

FIG. 1 is a view schematically showing the configuration of a vehicle 100 mounting a vehicle-mounted temperature control system 1 according to one embodiment. In FIG. 1, the left side shows the front of the vehicle 100, while the right side shows the rear of the vehicle 100. As shown in FIG. 1, the vehicle 100 is provided with an internal combustion engine 110, motor-generator (MG) 112, and power division mechanism 116. In addition, the vehicle 100 is provided with a power control unit (PCU) 118 electrically connected to the MG 112, and a battery 120 electrically connected to the PCU 118.

The internal combustion engine 110 is a prime mover making fuel burn inside of the engine and converting heat energy of the combustion gas to mechanical energy. The internal combustion engine 110 is connected to the power division mechanism 116, while the output of the internal combustion engine 110 is used for driving the vehicle 100 or generating electricity at the MG 112.

The MG 112 functions as a motor and a generator. The MG 112 is connected to the power division mechanism 116 and is used to drive the vehicle 100, or for power regeneration when braking the vehicle 100. Note that, in the present embodiment, as the motor driving the vehicle 100, an MG 112 having an electric power generating function is used, but a motor not having an electric power generating function may also be used.

The PCU 118 is connected between the battery 120 and the MG 112 and controls the electric power supplied to the MG 112. The PCU 118 has an inverter driving the motor, a boost converter controlling the voltage, a DC-DC converter stepping down a high voltage, and other heat generating parts. The battery 120 is connected to the PCU 118 and the MG 112, and supplies electric power for driving the vehicle 100 to the MG 112.

In the present embodiment, the internal combustion engine 110, the MG 112, and the PCU 118 are arranged at the rear of the vehicle 100, that is, at the rear from the passenger compartment. On the other hand, the battery 120 is arranged at the center of the vehicle 100, that is, below the passenger compartment.

Note that, the vehicle 100 may be any type of vehicle so long as a vehicle provided with an internal combustion engine 110 and MG (or motor) 112. Therefore, for example, the vehicle 100 may also be configured so that the internal combustion engine is used only for generation of electric power and so that only the motor drives the vehicle 100.

Figure 2:
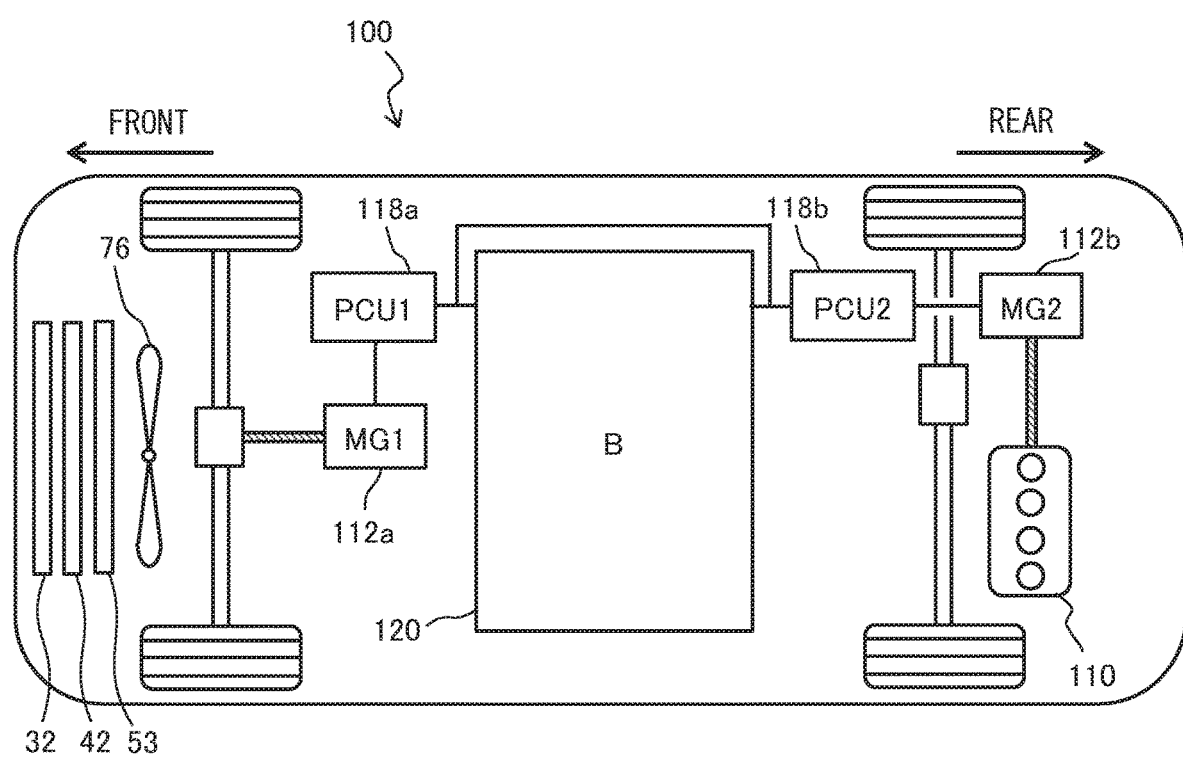
FIG. 2 is a view schematically showing another configuration of a vehicle mounting a vehicle-mounted temperature control system according to one embodiment.

For example, the vehicle 100' shown in FIG. 2 has a configuration where the internal combustion engine is used only for generation of electric power and only the motor drives the vehicle 100. As shown in FIG. 2, the vehicle 100 is provided with the internal combustion engine 110, the two MGs 112a and 112b, the two PCUs 118a and 118b, and the battery 120.

The drive power of the internal combustion engine 110 is used to drive the second MG 112b and generate electric power. The electric power generated by the second MG 112b is supplied to and stored in the battery 120, or is supplied to the first MG 112a. The first MG 112a is supplied with electric power from the battery 120 or the second MG 112b to drive the vehicle 100. Note that, the first MG 112a is used as a generator when generating electric power by a regenerative operation, while the second MG 112b is used as a motor when starting the internal combustion engine 110.

Configuration of Vehicle-Mounted Temperature Control System

Figure 3:
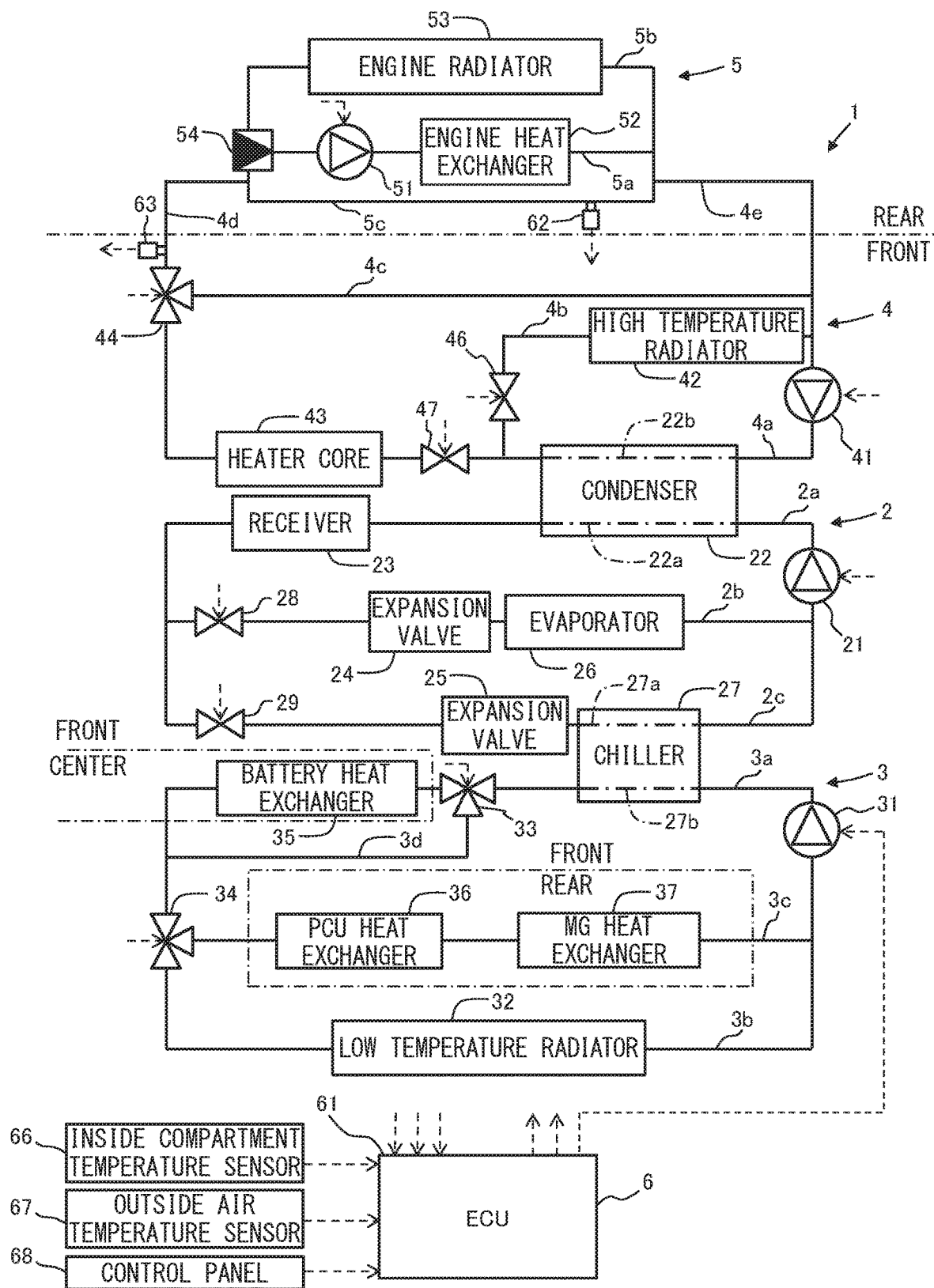
FIG. 3 is a view of the configuration schematically showing a vehicle-mounted temperature control system according to one embodiment.

Referring to FIGS. 1 to 4, the configuration of a vehicle-mounted temperature control system 1 according to one embodiment will be explained. FIG. 3 is a view of the configuration schematically showing the vehicle-mounted temperature control system 1. The vehicle-mounted temperature control system 1 includes a refrigeration circuit 2, low temperature circuit 3, high temperature circuit 4, and control device 6. The refrigeration circuit 2, low temperature circuit 3, high temperature circuit 4 function as heat circuit for exchanging heat with the outside of the circuit.

Refrigeration Circuit

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the evaporator 26 are provided in that order in a direction of circulation of the refrigerant. In addition, at the chiller flow path 2c, the second solenoid regulating valve 29, the second expansion valve 25, and the refrigerant piping 27a of the chiller 27 are provided in that order.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a heat exchanger for discharging heat from the refrigerant to the cooling water flowing through the cooling water piping 22b of a high temperature circuit 4 explained later, to cause the refrigerant to condense. If changing the viewpoint, the condenser 22 functions as a second heat exchanger which heats the cooling water in the high temperature circuit 4 by utilizing the heat other than the exhaust heat of the internal combustion engine 110. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquefied, therefore the receiver 23 is configured to separate the gas and liquid. Only liquid refrigerant, from which the gaseous refrigerant is separated, flows out from the receiver 23.

The first expansion valve 24 and the second expansion valve 25 functions as an expander for making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure.

The evaporator 26 functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a heat exchanger for making the refrigerant absorb heat from the cooling water flowing through the cooling water piping 27b of the later explained low temperature circuit 3 to evaporate the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, if possible to adjust the flow rate from the refrigerant basic flow path 2a to the evaporator flow path 2b and the chiller flow path 2c, some sort of valve may also be provided instead of these solenoid regulating valves 28 and 29.

Note that, in the present embodiment, as shown in FIG. 3, the refrigeration circuit 2 is arranged in the front of the vehicle 100, that is, at the front from the passenger compartment of the vehicle 100.

Low Temperature Circuit

Next, the low temperature circuit 3 will be explained. The low temperature circuit 3 includes a first pump 31, the cooling water piping 27b of the chiller 27, a low temperature radiator 32, first three-way valve 33, and second three-way valve 34. In addition, the low temperature circuit 3 includes the battery heat exchanger 35, PCU heat exchanger 36, and MG heat exchanger 37. In the low temperature circuit 3, the cooling water circulates through these components Note that, the cooling water is one example of the second heat medium. Inside the low temperature circuit 3, any other heat medium may be used instead of the cooling water.

The low temperature circuit 3 is divided into a low temperature basic flow path 3a, low temperature radiator flow path 3b, and heat generating device flow path 3c. The low temperature radiator flow path 3b and the heat generating device flow path 3c are provided parallel to each other and are respectively connected to the low temperature basic flow path 3a.

The low temperature basic flow path 3a is provided with, in a direction of circulation of cooling water, the first pump 31, the cooling water piping 27b of the chiller 27, and the battery heat exchanger 35 in that order. Further, at the low temperature basic flow path 3a, a battery bypass flow path 3d is connected so as to bypass the battery heat exchanger 35. At the connection part of the low temperature basic flow path 3a and the battery bypass flow path 3d, a first three-way valve is provided.

Further, the low temperature radiator flow path 3b is provided with the low temperature radiator 32. At the heat generating device flow path 3c, the PCU heat exchanger 36 and MG heat exchanger 37 are provided in that order in the direction of circulation of cooling water. The heat generating device flow path 3c may also be provided with a heat exchanger exchanging heat with heat generating device other than the MG and PCU. Between the low temperature basic flow path 3a and low temperature radiator flow path 3b and the heat generating device flow path 3c, a second three-way valve 34 is provided.

The first pump 31 pumps the cooling water circulating through the low temperature circuit 3. In the present embodiment, the first pump 31 is electrically driven water pumps, and is configured so as to be able to be changed in discharge capacities steplessly by adjustment of the electric power supplied to the first pump 31.

The low temperature radiator 32 is a heat exchanger exchanging heat with the cooling water circulating through the low temperature circuit 3 and the air outside of the vehicle 100 (outside air). The low temperature radiator 32 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 33 is configured so that the cooling water flowing out from the cooling water piping 27b of the chiller 27 flows selectively into the battery heat exchanger 35 or the battery bypass flow path 3d. The second three-way valve 34 is configured so that the refrigerant flowing out from the low temperature basic flow path 3a selectively flows between the low temperature radiator flow path 3b and the heat generating device flow path 3c.

Note that, if possible to suitably adjust the flow rate of the cooling water flowing to the battery heat exchanger 35 and battery bypass flow path 3d, an adjusting valve or on-off valve or other adjusting device may be used, instead of the first three-way valve 33. Similarly, if possible to suitably adjust the flow rate of the cooling water flowing into the low temperature radiator flow path 3b and heat generating device flow path 3c, an adjusting valve or on-off valve or other adjusting device may be used, instead of the second three-way valve 34.

The battery heat exchanger 35 is configured so as to exchange heat with the battery 120 of the vehicle 100. Specifically, the battery heat exchanger 35, for example, is provided with piping provided around the battery 120, and is configured so that heat is exchanged between the cooling water flowing through this piping and the battery. The battery is used for storing electric power generated by the MG or electrical power supplied from outside of the vehicle, and supplying electric power to the MG so as to drive the vehicle 100.

The PCU heat exchanger 36 is configured to exchange heat with the PCU 118 of the vehicle 100. Specifically, the PCU heat exchanger 36 is provided with piping provided around the PCU 118 and is configured so that heat is exchanged between the cooling water flowing through this piping and the battery. Further, the MG heat exchanger 37 is configured to exchange heat with the MG 112 of the vehicle 100. Specifically, the MG heat exchanger 37 is configured so that heat is exchanged between the oil flowing around the MG 112 and the cooling water.

Note that, as shown in FIG. 3, in the present embodiment, the MG 112 and PCU 118 are arranged at the rear of the vehicle, therefore the PCU heat exchanger 36 and MG heat exchanger 37 are arranged in the rear of the vehicle, that is, at the rear from the passenger compartment of the vehicle 100. On the other hand, the chiller 27, the first pump 31, and low temperature radiator 32 and the first three-way valve 33 and the second three-way valve 34 are arranged in the front of the vehicle, that is, at the front from the passenger compartment. Further, in the present embodiment, the battery 120 is arranged below the passenger compartment, therefore the battery heat exchanger 35 is arranged at the center of the vehicle 100, that is, below the passenger compartment. Note that, the battery 120 may also be arranged at a location other than below the passenger compartment. Therefore, the battery heat exchanger 35 may also be arranged at a location other than below the passenger compartment.

High Temperature Circuit

Next, the high temperature circuit 4 will be explained. The high temperature circuit 4 is provided with a second pump 41, cooling water piping 22b of the condenser 22, high temperature radiator 42, heater core 43, third three-way valve 44, third solenoid regulating valve 46, fourth solenoid regulating valve 47, and engine cooling circuit 5. In the high temperature circuit 4 as well, the cooling water circulates through these components. Note that, the cooling water is one example of the first heat medium. Inside the high temperature circuit 4, any other heat medium may be used instead of the cooling water.

Further, the high temperature circuit 4 is divided into a condenser flow path 4a, high temperature radiator flow path 4b, two-way flow path 4c, engine inflow flow path 4d, and engine outflow flow path 4e. The condenser flow path 4a is provided with, in order in the direction of circulation of the cooling water, the second pump 41, the cooling water piping 22b of the condenser 22, the fourth solenoid regulating valve 47, and the heater core 43. Note that, the condenser flow path 4a may also be provided with an electric heater at the upstream side of the heater core 43 in the direction of circulation of the cooling water. The high temperature radiator flow path 4b is provided with, in order in the direction of circulation of the cooling water, the third solenoid regulating valve 46 and high temperature radiator 42. Between the engine inflow flow path 4d and engine outflow flow path 4e, the engine cooling circuit 5 is provided.

The two sides of the high temperature radiator flow path 4b communicate with the condenser flow path 4a. Specifically, the upstream side end part of the high temperature radiator flow path 4b communicates with the condenser flow path 4a between the cooling water piping 22b of the condenser 22 and the fourth solenoid regulating valve 47. On the other hand, the downstream side end part of the high temperature radiator flow path 4b communicates with the condenser flow path 4a at the upstream side from the second pump 41. Further, the two ends of the condenser flow path 4a communicate with the two ends of the two-way flow path 4c. Therefore, the heater core 43 and the high temperature radiator 42 are provided alongside the second heating part.

The engine inflow flow path 4d connects the condenser flow path 4a and two-way flow path 4c to the engine cooling circuit 5. In particular, the engine inflow flow path 4d connects the downstream side end part of the condenser flow path 4a and the engine cooling circuit 5 at the inlet side of the engine heat exchanger 52.

The engine outflow flow path 4e also connects the condenser flow path 4a and two-way flow path 4c to the engine cooling circuit 5. In particular, the engine outflow flow path 4e connects the upstream side end part of the condenser flow path 4a and the engine cooling circuit 5 at the outlet side of the engine heat exchanger 52.

Further, the third three-way valve 44 is provided among the condenser flow path 4a, two-way flow path 4c, and engine inflow flow path 4d. Note that, the third three-way valve 44 may also be provided among the condenser flow path 4a, two-way flow path 4c, and engine outflow flow path 4e.

If changing the viewpoint, the high temperature circuit 4 may be considered to have a basic circuit (heat circuit) provided with the heater core 43 and cooling water piping 22b of the condenser 22, and a communication flow path communicating with the basic circuit. In this, the basic circuit has the condenser flow path 4a, high temperature radiator flow path 4b, and two-way flow path 4c. Therefore, in the basic circuit, cooling water can circulate between the cooling water piping 22b of the condenser 22, and the heater core 43 or high temperature radiator 42. On the other hand, the communication flow path has the engine inflow flow path 4d and engine outflow flow path 4e. Therefore, the communication flow path makes the engine cooling circuit 5 (in particular, the engine heat exchanger 52) communicate with the basic circuit.

The second pump 41 pumps the cooling water circulating through the high temperature circuit 4. In the present embodiment, the second pump 41 is an electrically powered water pump in the same way as the first pump 31. Further, the high temperature radiator 42, in the same way as the low temperature radiator 32, is a heat exchanger exchanging heat between the cooling water circulating through the high temperature circuit 4 and the outside air.

The heater core 43 is used for heating the passenger compartment by utilizing the heat of the cooling water in the high temperature circuit 4. The heater core 43 is configured to exchange heat between the cooling water circulating through the high temperature circuit 4 and the air around the heater core 43 to warm the air around the heater core 43, and as a result heat the inside of the passenger compartment. Specifically, the heater core 43 is configured to discharge the heat from the cooling water to the air around the heater core 43. Therefore, if high temperature cooling water flows to the heater core 43, the temperature of the cooling water decreases and the air around the heater core 43 is warmed.

The third three-way valve 44 functions as a communication a control device able to switch among a first communication state in which the condenser flow path 4a and two-way flow path 4c are communicated, a second communication state in which the engine inflow flow path 4d and two-way flow path 4c are communicated, and a third communication state in which the condenser flow path 4a and the engine inflow flow path 4d are communicated. In other words, the third three-way valve 44 functions as a connection state switching mechanism switching a flow state of the heat medium in the high temperature circuit 4. If the third three-way valve 44 is set at the first communication state, the cooling water inside the high temperature circuit 4 flows so as to circulate through the inside of the basic circuit. On the other hand, if the third three-way valve 44 is set to the second communication state, the cooling water inside the engine cooling circuit 5 flows through the two-way flow path 4c. In addition, if the third three-way valve 44 is set to the second communication state, the cooling water inside the engine cooling circuit 5 flows through the condenser flow path 4a. Note that, if possible to control the flow state of the cooling water in the above way, instead of the third three-way valve 44, a regulating valve or shutoff valve or other flow state control device may also be used.

The third solenoid regulating valve 46 and fourth solenoid regulating valve 47 are used as the circulation mode control device for controlling the mode of circulation of cooling water in the high temperature circuit 4, in particular for controlling the mode of circulation of cooling water from the cooling water piping 22b of the condenser 22 to the high temperature radiator 42 and heater core 43. The larger the opening degree of the third solenoid regulating valve 46, the greater the cooling water flowing into the high temperature radiator flow path 4b, and accordingly the greater the cooling water flowing into the high temperature radiator 42. Further, the greater the opening degree of the fourth solenoid regulating valve 47, the greater the cooling water flowing into the condenser flow path 4a. Note that, in the present embodiment, the solenoid regulating valves 46 and 47 are configured as valves able to be adjusted in opening degrees, but may also be on-off valves switched between the opened state and the closed state. Further, instead of the third solenoid regulating valve 46 and fourth solenoid regulating valve 47, a three-way valve able to make the cooling water from the condenser flow path 4a selectively flow to only the high temperature radiator flow path 4b, only the two-way flow path 4c, and/or both may be provided. Therefore, if possible to adjust the flow rate from the condenser flow path 4a to the high temperature radiator flow path 4b and two-way flow path 4c, any sort of valves may be provided as third circulation mode control devices instead of these solenoid regulating valves 46 and 47.

Note that, as shown in FIG. 3, in the present embodiment, the engine cooling circuit 5 is arranged in the rear of the vehicle 100, that is, at the rear from the passenger compartment of the vehicle 100. On the other hand, the components of the high temperature circuit 4 other than the engine cooling circuit 5 (condenser 22, high temperature radiator 42, heater core 43, etc.) are arranged in the front of the vehicle, that is, at the front from the passenger compartment. In particular, the basic circuit of the high temperature circuit 4 is arranged at the front of the vehicle. Therefore, the engine inflow flow path 4d and engine outflow flow path 4e are arranged so as to extend between the front and rear of the passenger compartment.

Engine Cooling Circuit

Next, the engine cooling circuit 5 will be explained. The engine cooling circuit 5 is provided with a third pump 51, engine heat exchanger 52, engine radiator 53, and thermostat 54. In the engine cooling circuit 5, cooling water, which is the same as that in the high temperature circuit 4, is circulated through these components.

Further, the engine cooling circuit 5 is divided into an engine basic flow path 5a, engine radiator flow path 5b, and engine bypass flow path 5c. The engine radiator flow path 5b and the engine bypass flow path 5c are provided in parallel with each other, and are respectively connected to the engine basic flow path 5a.

The engine basic flow path 5a is provided with a third pump 51 and an engine heat exchanger 52 in that order in the direction of circulation of the cooling water. The engine radiator flow path 5b is provided with an engine radiator 53. Further, the engine inflow flow path 4d and engine outflow flow path 4e communicate with the engine bypass flow path 5c. In particular, the engine inflow flow path 4d is communicated with the downstream side part of the engine bypass flow path 5c. As a result, the engine inflow flow path 4d communicates with the vicinity of the inlet of the engine heat exchanger 52. On the other hand, the engine outflow flow path 4e communicates with the upstream side part of the engine bypass flow path 5c. As a result, the engine inflow flow path 4d communicates with the vicinity of the outlet of the engine heat exchanger 52. Therefore, the engine heat exchanger 52 is configured to communicate with the high temperature circuit 4 so that the cooling water of the high temperature circuit 4 circulates through it. Between the engine basic flow path 5a and the engine radiator flow path 5b and engine bypass flow path 5c, a thermostat 54 is provided. Note that, although, in the example shown in FIG. 3, the engine outflow path 4e communicates with the engine bypass path 5c, it may communicates with the engine radiator flow path 5b.

The third pump 51 pumps cooling water circulating through the engine cooling circuit 5. In the present embodiment, the third pump 51 is an electrically powered water pump which is the same type as the first pump 31. Further, the engine radiator 53 is, similarly to the low temperature radiator 32, a heat exchanger exchanging heat between the cooling water circulating through the engine cooling circuit 5 and the outside air.

The engine heat exchanger 52 functions as a first heating part which is used for utilizing the exhaust heat of the internal combustion engine 110 to heat the cooling water. That is, the engine heat exchanger 52 discharges the heat of the internal combustion engine 110 to the cooling water inside of the engine cooling circuit 5 to heat the cooling water. The engine heat exchanger 52 discharges the heat generated along with combustion of fuel inside the internal combustion engine 110 into the cooling water to thereby keep the internal combustion engine 110 from excessively rising in temperature. The engine heat exchanger 52, for example, has cooling water passages provided inside the cylinder block and cylinder head of the internal combustion engine 110.

The thermostat 54 is a valve which is switched between a closed state which cuts off the flow of cooling water flowing through the engine radiator flow path 5b and an opened state which permits the flow of cooling water through the engine radiator flow path 5b. The thermostat 54 is opened to enable cooling water to flow to the engine radiator flow path 5b when the temperature of the cooling water circulating through the engine bypass flow path 5c is equal to or greater than a predetermined temperature. On the other hand, the thermostat 54 is closed so that cooling water does not flow to the engine radiator flow path 5b when the temperature of the cooling water circulating through the engine bypass flow path 5c is less than the predetermined temperature. As a result, the temperature of the cooling water circulating through the engine heat exchanger 52 is held substantially constant.

Figure 4:
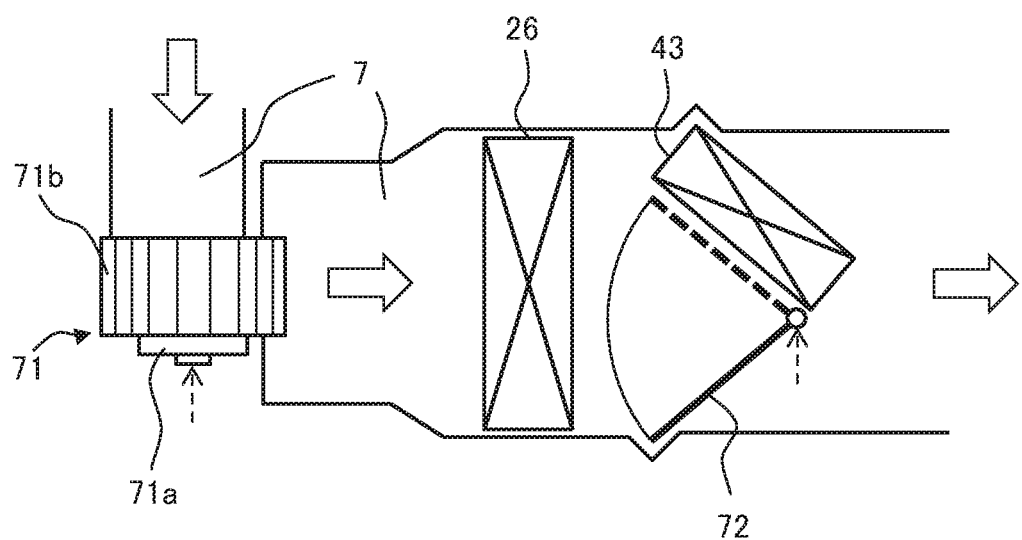
FIG. 4 is a view of the configuration schematically showing an air passage for air-conditioning of a vehicle mounting the vehicle-mounted temperature control system.

FIG. 4 is a view of the configuration schematically showing the air passage 7 for air-conditioning the vehicle 100 mounting the vehicle-mounted temperature control system 1. In the air passage 7, air flows in the direction shown by the arrow marks in the figure. The air passage 7 shown in FIG. 4 is connected to the outside of the vehicle 100 or the air intake openings of the passenger compartment. The outside air or the air inside the passenger compartment flows into the air passage 7, according to the state of control by the control device 6. Further, the air passage 7 shown in FIG. 4 is connected to a plurality of air vent openings blowing air into the passenger compartment. Air is supplied from the air passage 7 to any of the air vent openings according to the state of control by the control device 6.

As shown in FIG. 4, at the air passage 7 for air-conditioning of the present embodiment, a blower 71, evaporator 26, air mix door 72, and heater core 43 are provided in that order in the direction of flow of the air.

The blower 71 is provided with a blower motor 71a and a blower fan 71b. The blower 71 is configured so that if the blower fan 71b is driven by the blower motor 71a, the outside air or the air inside the passenger compartment flows into the air passage 7 and the air flows through the air passage 7. When the heating or cooling of the passenger compartment is required, the blower fan 71 is basically driven.

The air mix door 72 adjusts the flow rate of the air flowing through the heater core 43 in the air flowing through the air passage 7. The air mix door 72 is configured to be able to be adjusted among the state where all of the air flowing through the air passage 7 flows through the heater core 43, the state where none of the air flowing through the air passage 7 flows through the heater core 43, and states between them.

In the thus configured air passage 7, when the blower 71 is driven, if the refrigerant circulates through the evaporator 26, the air flowing through the air passage 7 is cooled. Further, when the blower 71 is driven, if the cooling water circulates to the heater core 43 and the air mix door 72 is controlled so that air flows through the heater core 43, the air flowing through the air passage 7 is warmed.

As shown in FIG. 1, at the inside of the front grille of the vehicle 100, a low temperature radiator 32, high temperature radiator 42 and engine radiator 53 are arranged. Therefore, when the vehicle 100 is flowing, wind generated based on movement of vehicle strikes these radiators 32, 42 and 53. Further, a fan 76 is provided adjacent to these radiators 32, 42 and 53. The fan 76 is configured so that if driven, the air strikes the radiators 32, 42 and 53. Therefore, even when the vehicle 100 is not flowing, by driving the fan 76, it is possible to make air strike the radiators 32, 42 and 53.

Control Device

Referring to FIG. 1, the control device 6 is provided with an electronic control unit (ECU) 61. The ECU 61 is provided with a processor for performing various types of processing, a memory storing programs and various types of information, and an interface connected with various actuators and various sensors.

Further, the control device 6 is provided with a first water temperature sensor 62 for detecting the temperature of the cooling water inside the engine cooling circuit 5, in particular, the temperature of the cooling water flowing through the engine bypass flow path 5c. In addition, the control device 6 is provided with a second water temperature sensor 63 detecting the temperature of the cooling water flowing through the engine inflow flow path 4d at the front of the vehicle or the temperature of the cooling water flowing through the two-way flow path 4c. The ECU 61 is connected to these sensors. The ECU 61 receives as input the output signals from these sensors.

In addition, the control device 6 is provided with an inside compartment temperature sensor 66 detecting the temperature at the inside of the passenger compartment of the vehicle 100, an outside air temperature sensor 67 detecting the temperature of the outside of the passenger compartment of the vehicle 100, and a control panel 68 operated by the user. The ECU 61 is connected to these sensors and control panel 68. The ECU 51 receives, as input, the output signals from these sensors and control panel 68.

The ECU 61 judges the presence of a cooling demand or heating demand based on the output signals from the sensors 66 and 67 and control panel 68. For example, if a user turns on the heating switch of the control panel 68, the ECU 61 judges that heating is demanded. Further, if a user turns on an auto switch of the control panel 68, for example, the ECU 61 judges that heating is demanded when the inside compartment temperature set by the user is lower than the temperature detected by the inside compartment temperature sensor 66.

In addition, the ECU 61 is connected to various actuators of the vehicle-mounted temperature control system 1, and controls these actuators. Specifically, the ECU 61 is connected to the compressor 21, solenoid regulating valves 28, 29, 46, 47, pumps 31, 41, 51, three-way valves 33, 34, 44, a blower motor 71a, air mix door 72, and fan 76, and controls the same. Therefore, the ECU 61 functions as a control device controlling a connection state switching mechanism switching the flow state of a heat medium (refrigerant and cooling water) in the refrigeration circuit 2, low temperature circuit 3, and high temperature circuit 4 (including engine cooling circuit 5).

Operation of Vehicle-Mounted Temperature Controller

Next, referring to FIGS. 5 to 10, typical flow states of the heat medium (refrigerant and cooling water) in the vehicle-mounted temperature control system 1 will be explained. In FIGS. 5 to 10, a flow path through which the refrigerant or the cooling water flows is shown by a solid line, while a flow path through which the refrigerant or cooling water does not flow is shown by a broken line. Further, thin arrow marks in the figures show flow directions of refrigerant or cooling water, and thick arrow marks in the figures show directions of movement of heat.

Figure 5:
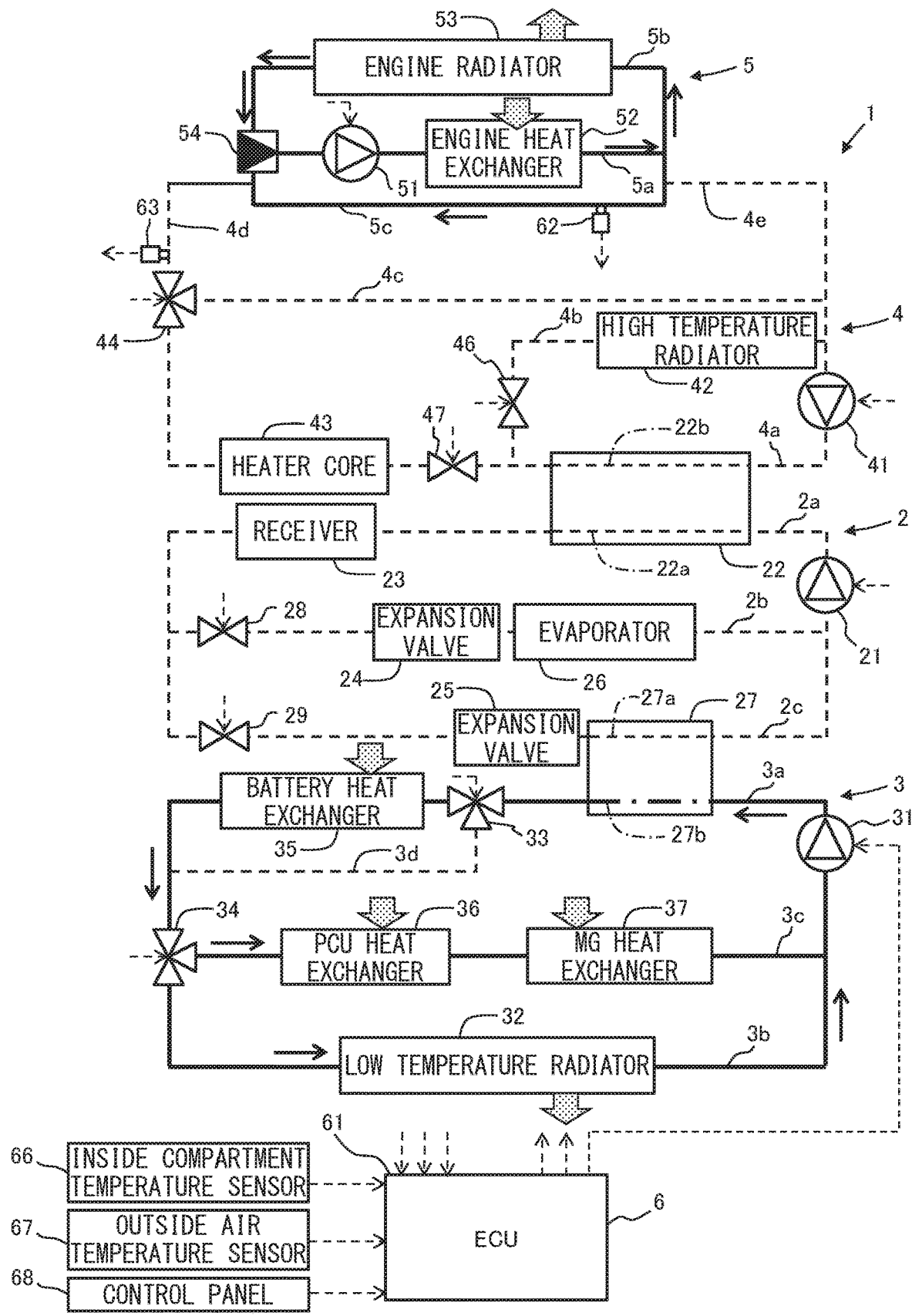
FIG. 5 shows a flow state of a heat medium in a vehicle-mounted temperature control system in a case where neither cooling nor heating of a passenger compartment is demanded and cooling of a battery or other heat generating device is required (first stopping mode).

FIG. 5 shows the flow state of the heat medium in the vehicle-mounted temperature control system 1 in the case where neither cooling nor heating of the passenger compartment is demanded and cooling of a heat generating device such as the battery is required (first stopping mode).

As shown in FIG. 5, in the first stopping mode, the compressor 21 and the second pump 41 are stopped from operating. Therefore, in the refrigeration circuit 2, no refrigerant circulates. Further, in the high temperature circuit 4, no cooling water circulates. On the other hand, in the first stopping mode, the first pump 31 is operated. Therefore, cooling water circulates in the low temperature circuit 3.

Further, in the first stopping mode, the first three-way valve 33 is set so that cooling water circulates through the battery heat exchanger 35. Further, in the example shown in FIG. 5, the second three-way valve 34 is set so that the cooling water flows to both of the low temperature radiator flow path 3b and heat generating device flow path 3c. Note that the first three-way valve 33 may be set so that cooling water does not flow through the battery heat exchanger 35 in the first stopping mode.

As a result, in the first stopping mode, in the battery heat exchanger 35, PCU heat exchanger 36 and MG heat exchanger 37 (hereinafter, these are referred to as "heat exchanger of heat generating device"), the heat of the battery, MG 112 and PCU 118 (heat generating device) is transferred to the cooling water. For this reason, the heat generating device is cooled and the temperature of the cooling water rises to equal to or greater than the temperature of the outside air. After that, the cooling water is cooled at the low temperature radiator 32 by heat exchange with the outside air, and again flows into the heat exchangers of heat generating device. Therefore, in the first stopping mode, heat is absorbed from the heat generating device at the heat exchanger of heat generating device and that heat is discharged at the low temperature radiator 32.

Note that, in the example shown in FIG. 5, at this time, the internal combustion engine 110 is operating. For this reason, the third pump 51 is operated and the third three-way valve 44 is set to the third communication state, and therefore cooling water is circulated in the engine cooling circuit 5. If the temperature of the cooling water in the engine cooling circuit 5 is high, the thermostat 54 opens and cooling water is circulated to the engine radiator 53 as well. Further, when the internal combustion engine 52 is stopped, the operation of the third pump 51 is stopped and accordingly cooling water is not circulated in the engine cooling circuit 5.

Figure 6:
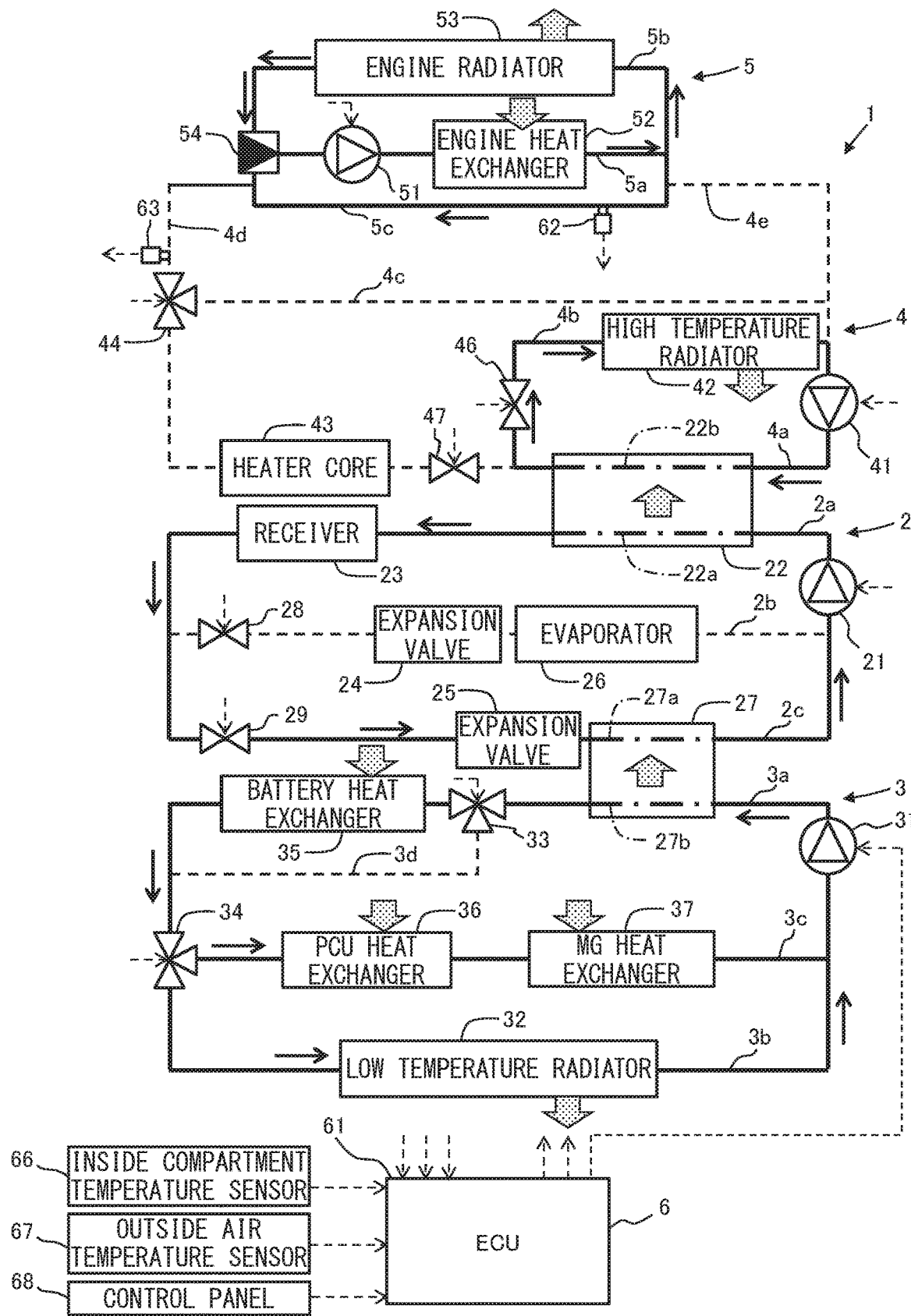
FIG. 6 shows a flow state of a heat medium in a vehicle-mounted temperature control system in a case where neither cooling nor heating of a passenger compartment is demanded and rapid cooling of a heat generating device is required (second stopping mode).

FIG. 6 shows the flow state of the heat medium in the vehicle-mounted temperature control system 1 in the case where neither cooling nor heating of the passenger compartment is demanded and rapid cooling of a heat generating device is required (second stopping mode). Further, in the example shown in FIG. 6, the internal combustion engine is operating.

As shown in FIG. 6, in the second stopping mode, all of the compressor 21, first pump 31, and second pump 41 are operated. Therefore, the refrigerant or cooling water is circulated in all of the refrigeration circuit 2, low temperature circuit 3, and high temperature circuit 4.

Further, in the second stopping mode, the first solenoid regulating valve 28 is closed and the second solenoid regulating valve 29 is opened. Therefore, refrigerant does not flow through the evaporator 26, while refrigerant flows through the chiller 27. In addition, in the second stopping mode, the first three-way valve 33 is set so that the cooling water flows through the battery heat exchanger 35. Further, in the example shown in FIG. 6, the second three-way valve 34 is set so that the cooling water flows to both of the low temperature radiator flow path 3b and heat generating device flow path 3c. By doing this, cooling water also flows to the PCU heat exchanger 36 and the MG heat exchanger 37, therefore the MG 112 and the PCU 118 can be cooled. Further, in the second stopping mode, the third solenoid regulating valve 46 is opened and the fourth solenoid regulating valve 47 is closed. Therefore, the cooling water in the high temperature circuit 4 flows through the condenser 22, then flows into the high temperature radiator flow path 4b.

As a result, in the second stopping mode, the heat of the cooling water in the low temperature circuit 3 is transferred to the refrigerant at the chiller 27, whereby the cooling water is cooled. After that, this low temperature cooling water flows to the battery heat exchanger 35 or other heat exchanger of a heat generating device, whereby the heat generating device is cooled. On the other hand, heat of the refrigerant is transferred at the condenser 22 to the high temperature circuit 4, whereby the cooling water in the high temperature circuit 4 is warmed. After that, this high temperature cooling water is cooled at the high temperature radiator 42 by heat exchange with the outside air and again flows into the condenser 22. Therefore, in the second stopping mode, heat is absorbed from the heat generating device at the heat exchanger of the heat generating device and that heat is discharged at the high temperature radiator 42.

Figure 7:
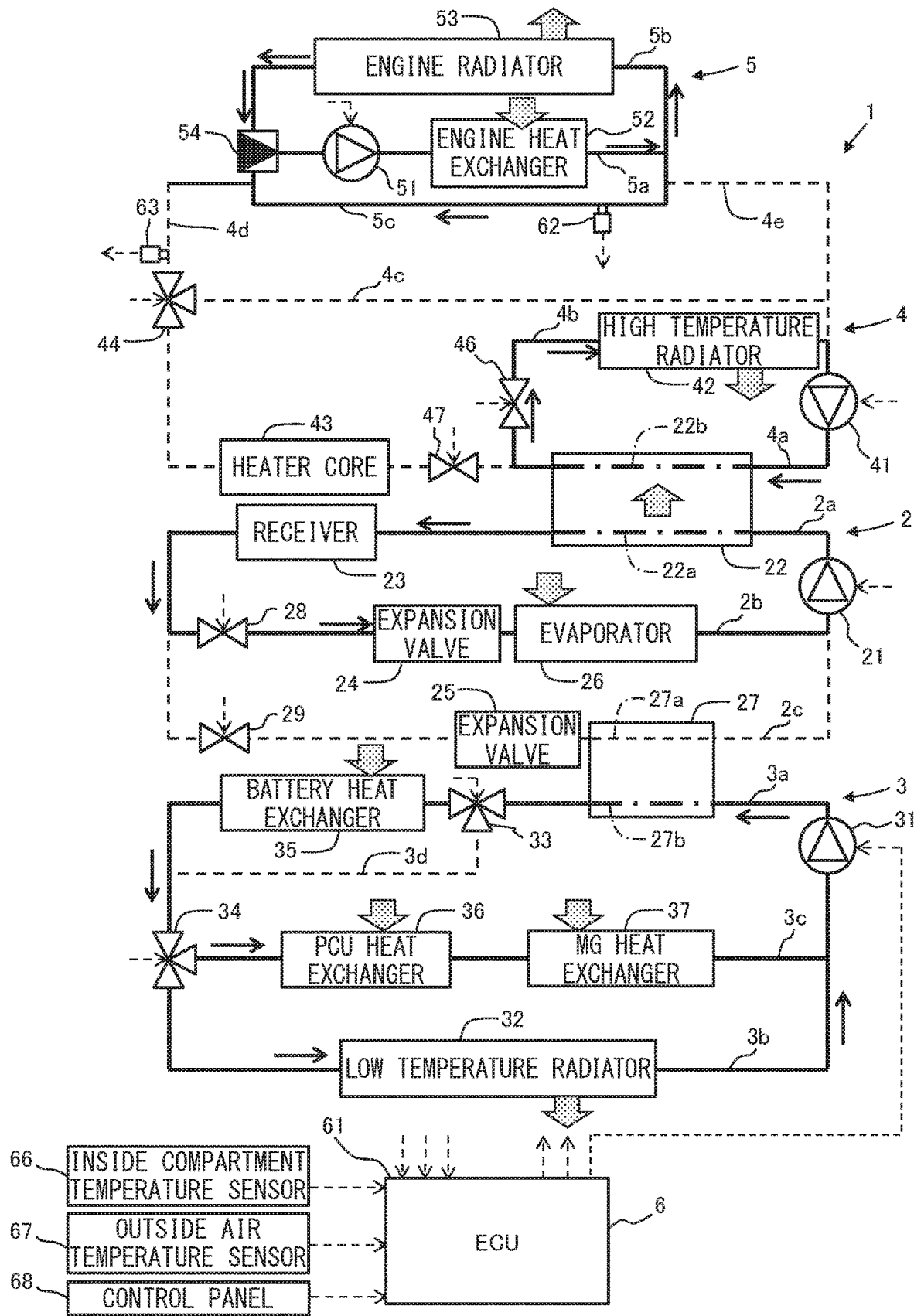
FIG. 7 shows a flow state of a heat medium in a vehicle-mounted temperature control system in a case where cooling of a passenger compartment is demanded and cooling of a heat generating device is required (first cooling mode).

FIG. 7 shows the flow state of the heat medium in the vehicle-mounted temperature control system 1 in the case where cooling of the vehicle compartment is demanded and cooling of a heat generating device is necessary (first cooling mode). Further, in the example shown in FIG. 7, the internal combustion engine 110 is operating.

As shown in FIG. 7, in the first cooling mode, the compressor 21, first pump 31, and second pump 41 are all being operated. Further, in the first cooling mode, the first solenoid regulating valve 28 is opened and the second solenoid regulating valve 29 is closed and, further, the third solenoid regulating valve 46 is opened and the fourth solenoid regulating valve 47 is closed. Further, in the example shown in FIG. 7, the second three-way valve 34 is set so that the cooling water flows to both of the low temperature radiator flow path 3b and heat generating device flow path 3c.

As a result, in the first cooling mode, the heat of the surrounding air is transferred to the refrigerant at the evaporator 26, whereby the surrounding air is cooled. On the other hand, the heat of the refrigerant is transferred to the high temperature circuit 4 at the condenser 22, whereupon the cooling water in the high temperature circuit 4 is warmed. After that, this high temperature cooling water is cooled by exchange of heat with the outside air at the high temperature radiator 42, and again flows into the condenser 22. Therefore, in the first cooling mode, heat is absorbed from the surrounding air at the evaporator 26, and that heat is discharged at the high temperature radiator 42.

Further, in the first cooling mode, heat of a heat generating device is transferred to the cooling water at the heater exchanger of the heat generating device. After that, the cooling water is cooled by exchange of heat with the outside air at the low temperature radiator 32, and again flows into the battery heat exchanger 35. Therefore, the heat is absorbed from the heat generating device at the heat exchanger of the heat generating device, and that heat is discharged at the low temperature radiator 32.

Figure 8:
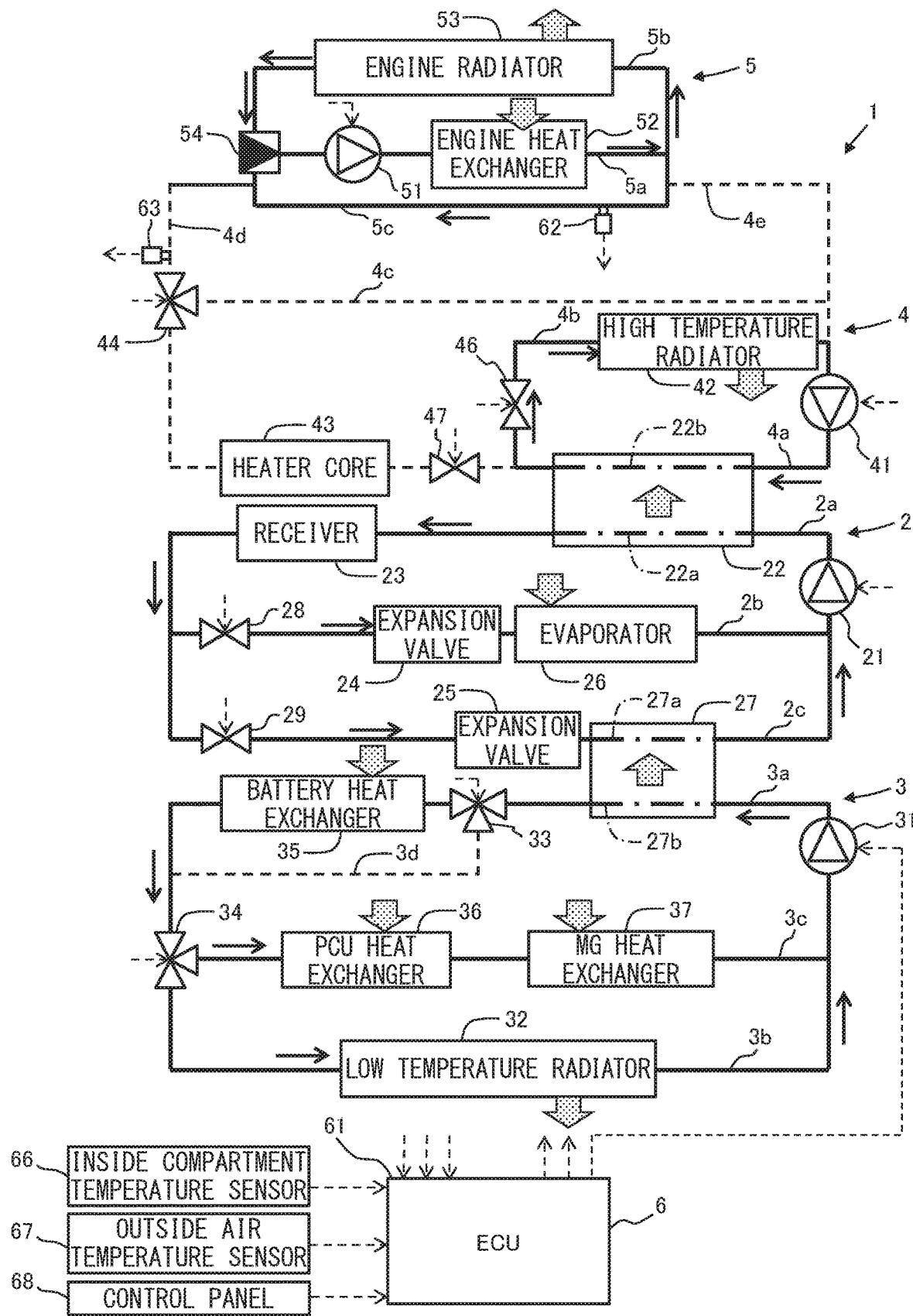
FIG. 8 shows a flow state of a heat medium in a vehicle-mounted temperature control system in a case where cooling of a passenger compartment is demanded and rapid cooling of a heat generating device is required (second cooling mode).

FIG. 8 shows the flow state of the heat medium in the vehicle-mounted temperature control system 1 in the case where cooling of the vehicle compartment is demanded and rapid cooling of a heat generating device is necessary (second cooling mode).

As shown in FIG. 8, in the second cooling mode, the compressor 21, first pump 31, and second pump 41 are all operated. Further, in the second cooling mode, the first solenoid regulating valve 28 and the second solenoid regulating valve 29 are both opened. Accordingly, refrigerant flows through both of the evaporator 26 and the chiller 27. At this time, the opening degrees of the solenoid regulating valves 28 and 29 are adjusted in accordance with the cooling strength, battery temperature, etc. In addition, in the second cooling mode, the first three-way valve 33 is set so that the cooling water flows through the battery heat exchanger 35. Further, in the example shown in FIG. 8, the second three-way valve 34 is set so that the cooling water flows to both of the low temperature radiator flow path 3b and heat generating device flow path 3c. However, the second three-way valve 34 may be set so that the cooling water flows only to the low temperature radiator flow path 3b. Furthermore, in the second cooling mode, the third solenoid regulating valve 46 is opened, while the fourth solenoid regulating valve 47 is closed.

As a result, in the second cooling mode, the heat of the cooling water in the low temperature circuit 3 is transferred to the refrigerant at the chiller 27, whereby this cooling water is cooled. After that, this low temperature cooling water flows to the heat exchanger of the heat generating device, whereby the heat generating device is cooled. Further, in the second cooling mode, heat of the surrounding air is transferred to the refrigerant at the evaporator 26, whereby the surrounding air is cooled. On the other hand, the heat of the refrigerant is transferred to the high temperature circuit 4 at the condenser 22, whereby the cooling water in the high temperature circuit 4 is warmed. After that, this high temperature cooling water is cooled by heat exchange with the outside air at the high temperature radiator 42 and again flows into the condenser 22. Therefore, in the second cooling mode, heat is absorbed from the heat generating device at the heat exchanger of the heat generating device, heat is absorbed from the surrounding air at the evaporator 26, and that heat is discharged at the high temperature radiator 42.

Figure 9:
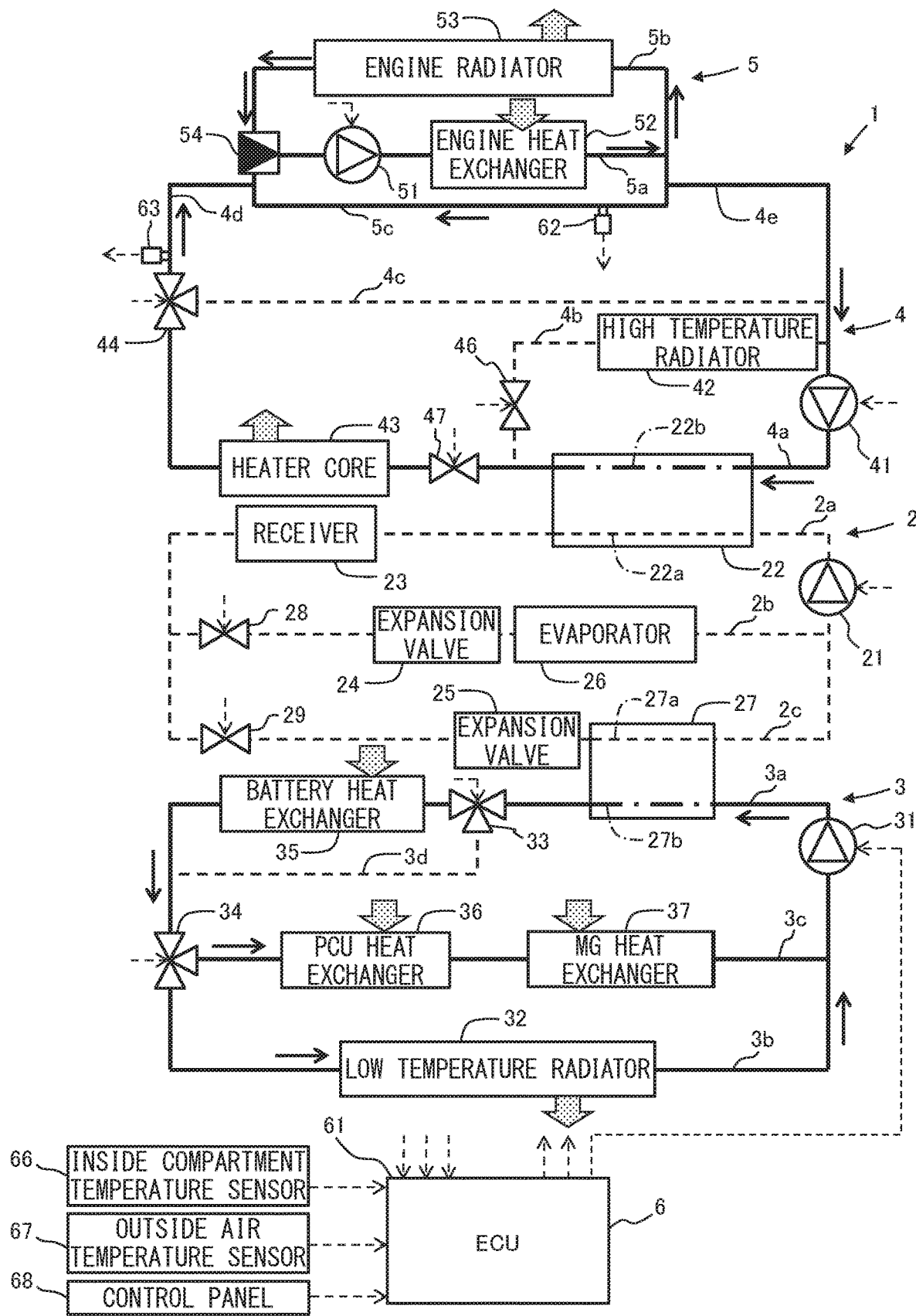
FIG. 9 shows a flow state of a heat medium in a vehicle-mounted temperature control system in a case where heating of a passenger compartment is demanded and the internal combustion engine is being operated (first heating mode).

FIG. 9 shows a flow state (first flow state) of the heat medium in the vehicle-mounted temperature control system 1 in the case where heating of the vehicle compartment is demanded and the internal combustion engine is being warmed (first heating mode).

As shown in FIG. 9, in the first heating mode, the compressor 21 is stopped. Therefore, refrigerant does not circulate in the refrigeration circuit 2. Further, as shown in FIG. 9, the first pump 31, second pump 41, and third pump 51 are all operated. Therefore, cooling water circulates in the low temperature circuit 3, and engine cooling circuit 5.

Further, in the first heating mode, the third three-way valve 44 is set to the third communication state. Therefore, the engine outflow flow path 4e is communicated with the condenser flow path 4a, and the condenser flow path 4a is communicated with the engine inflow flow path 4d. As a result, in the high temperature circuit 4, the cooling water flowing out from the engine cooling circuit 5 flows through the engine outflow flow path 4e into the condenser flow path 4a, and then returns through the engine inflow flow path 4d to the engine cooling circuit 5. Therefore, in the first heating mode, the cooling water heated at the engine heat exchanger 52 flows through the heater core 43, while flowing through a part of the heat circuit.

In addition, in the first heating mode, the cooling water in the low temperature circuit 3, in the same way as the first stopping mode, circulates in the low temperature circuit 3. Therefore, in the first heating mode, heat is absorbed from the heat generating device at the heat exchanger of the heat generating device and that heat is discharged at the low temperature radiator 32.

As a result, in the first heating mode, part of the cooling water raised in temperature by the heat of the internal combustion engine at the engine heat exchanger 52 flows into the heater core 43. The cooling water flowing into the heater core 43 is cooled by exchange of heat with the surrounding air at the heater core 43. Along with this, the surrounding air is raised in temperature. Therefore, at the first heating mode, heat is absorbed from the internal combustion engine at the engine heat exchanger 52, and that heat is discharged at the heater core 43. In addition, in the first heating mode, heat is absorbed from the heat generating device at the heat exchanger of the heat generating device, and that heat is discharged at the low temperature radiator 32.

Note that, when heating and dehumidification of the passenger compartment are demanded and the internal combustion engine is operated in a warmed up state, in the first heating mode, the compressor 21 is operated and the first solenoid regulating valve 28 is opened and the second solenoid regulating valve 29 is closed. Therefore, in the refrigeration circuit 2, the refrigerant is circulated. In addition, the second pump 41 is operated and the third solenoid regulating valve 46 is opened. Therefore, the cooling water is circulated between the high temperature radiator 42 and the condenser 22.

Further, the flow state of the heat medium shown in FIG. 9 is one example in the first heating mode. Therefore, as long as part of the cooling water heated in the engine heat exchanger 52 flows through the heater core 43, the flow state may be one different from the flow state shown in FIG. 9. For example, in the first heating mode, cooling water need not be circulated at the low temperature circuit 3 and need not flow through the heat exchangers of some heat generating devices. Further, the refrigerant may also circulate in the refrigeration circuit 2.

Figure 10:
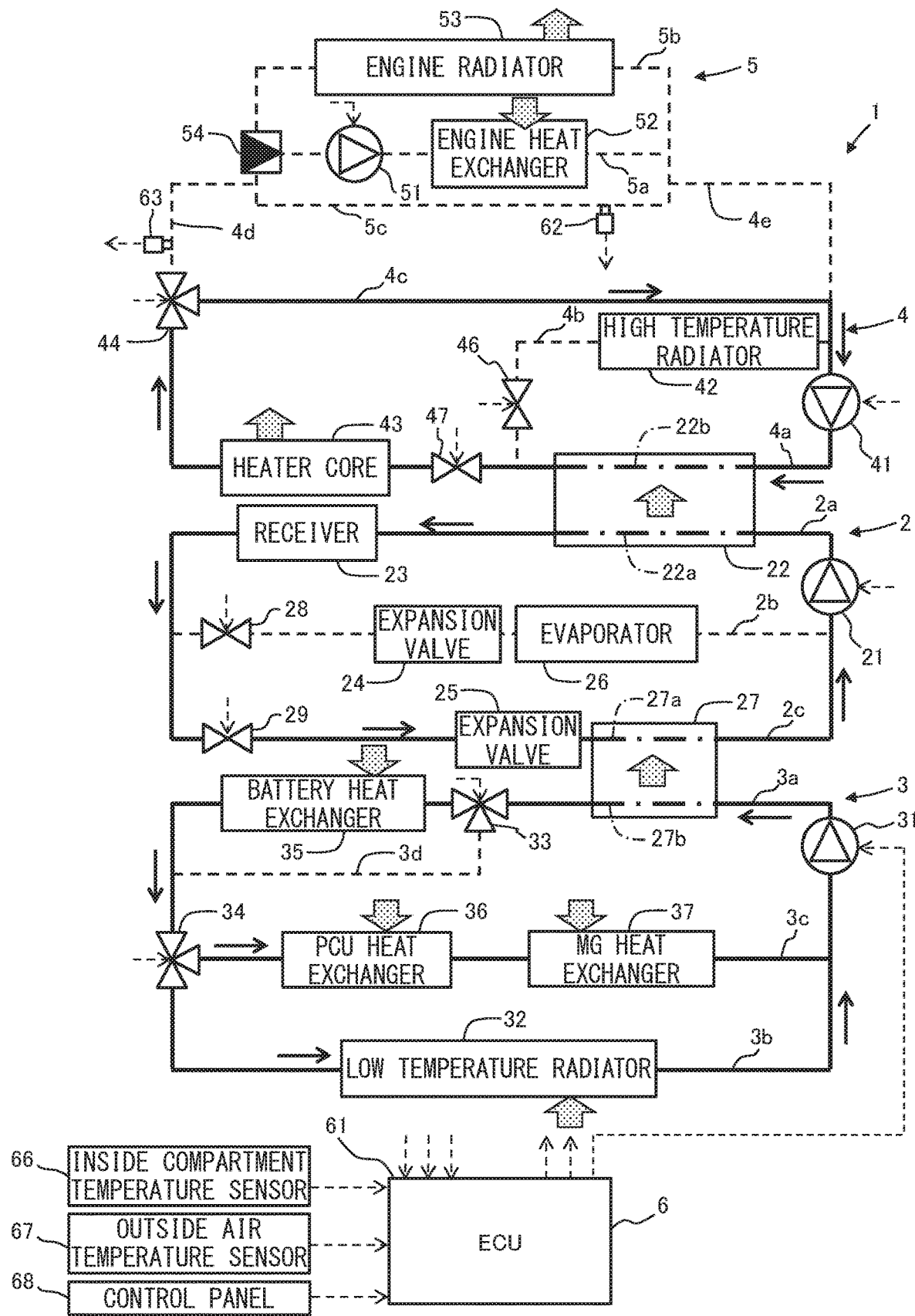
FIG. 10 shows a flow state of a heat medium in a vehicle-mounted temperature control system in a case where heating of a passenger compartment is demanded and the internal combustion engine is stopped (fourth heating mode).

FIG. 10 shows the flow state (fourth flow state) of the heat medium in the vehicle-mounted temperature control system 1 in the case where heating of the passenger compartment is demanded and the internal combustion engine is stopped (fourth heating mode).

As shown in FIG. 10, in the fourth heating mode, the compressor 21, first pump 31, and second pump 41 are made to operate. Further, in the fourth heating mode, the first solenoid regulating valve 28 is closed and the second solenoid regulating valve 29 is opened. Therefore, refrigerant does not flow through the evaporator 26. Refrigerant flows through the chiller 27. In addition, in the fourth heating mode, the first three-way valve 33 is set so that the cooling water flows through the battery heat exchanger 35. Further, in the example shown in FIG. 10, the second three-way valve 34 is set so that the cooling water flows to both of the low temperature radiator flow path 3b and heat generating device flow path 3c. However, the second three-way valve 34 may also be set so that the cooling water flows through only the low temperature radiator flow path 3b. Furthermore, in the fourth heating mode, the third solenoid regulating valve 46 is closed, the fourth solenoid regulating valve 47 is opened, and the fourth three-way valve 45 is set to the first communication state. Therefore, the cooling water in the high temperature circuit 4 passes through the condenser 22, then flows through the heater core 43 and two-way flow path 4c and is again returned to the condenser 22. Further, the internal combustion engine 110 stops. Accordingly, the third pump 51 also stops. For this reason, the cooling water does not flow through the engine inflow flow path 4d or the engine outflow flow path 4e.

As a result, in the fourth heating mode, at the chiller 27, the heat of the cooling water inside of the low temperature circuit 3 moves to the refrigerant whereby the cooling water is cooled. As shown in FIG. 10, when the first three-way valve 33 and the second three-way valve 34 are set so that the cooling water flows through the heat exchangers of the heat generating device, this low temperature cooling water flows to the heat exchangers of the heat generating devices and low temperature radiator 32, and the heat is absorbed in the cooling water from the heat generating devices or outside air.

Further, at the condenser 22, the heat of the refrigerant is moved to the high temperature circuit 4 whereby the cooling water inside the high temperature circuit 4 is warmed. After this, this high temperature cooling water is cooled at the heater core 43 by heat exchange with the surrounding air. Along with this, the surrounding air is raised in temperature. Therefore, in the fourth heating mode, heat is absorbed from the outside air at the low temperature radiator 32 and in some cases, heat is absorbed from the heat generating devices at the heat exchangers of the heat generating devices, and that heat is discharged at the heater core 43.

Note that, the flow state of the heat medium shown in FIG. 10 is one example of the fourth heating mode. Therefore, as long as the cooling water heated at the condenser 22 flows through the heater core 43, the flow state may be different from the flow state shown in FIG. 10. For example, in the fourth heating mode, at the low temperature circuit 3, the cooling water need not flow to the heat exchangers of part of the heat generating devices. Further, when heating and dehumidification of the passenger compartment are demanded and the internal combustion engine stops, the refrigerant may also flow through the evaporator 26 at the refrigeration circuit 2.

Cold Start of Internal Combustion Engine

Next, control of the flow state of the heat medium when heating of the passenger compartment is demanded during cold start of the internal combustion engine 110 will be explained. Here, "during cold start of the internal combustion engine 110" means during the period during warmup from when operation of the internal combustion engine 110 is started in a state of a low temperature of the internal combustion engine 110 to when the temperature of the internal combustion engine 110 becomes sufficiently high. Specifically, "during cold start of the internal combustion engine 110" means, for example, during the period until the temperature of the cooling water circulating through the inside of the engine cooling circuit 5 reaches a warmup reference temperature (for example, 90° C.).

Before the start of cold start of the internal combustion engine 110, the internal combustion engine 110 is stopped. Further, if heating of the passenger compartment is demanded from before start of cold start of the internal combustion engine 110, the vehicle-mounted temperature control system 1 is made to operate in the fourth heating mode (FIG. 10) before the start of cold start of the internal combustion engine 110. On the other hand, if a demand for heating of the passenger compartment is started at the same time as the start of cold start of the internal combustion engine 110, before cold start, the vehicle-mounted temperature control system 1 is made to operate at the first stopping mode (FIG. 5) or is stopped. Therefore, before cold start of the internal combustion engine 110, cooling water does not flow at least at the engine cooling circuit 5, engine inflow flow path 4d, and engine outflow flow path 4e.

Figure 11:
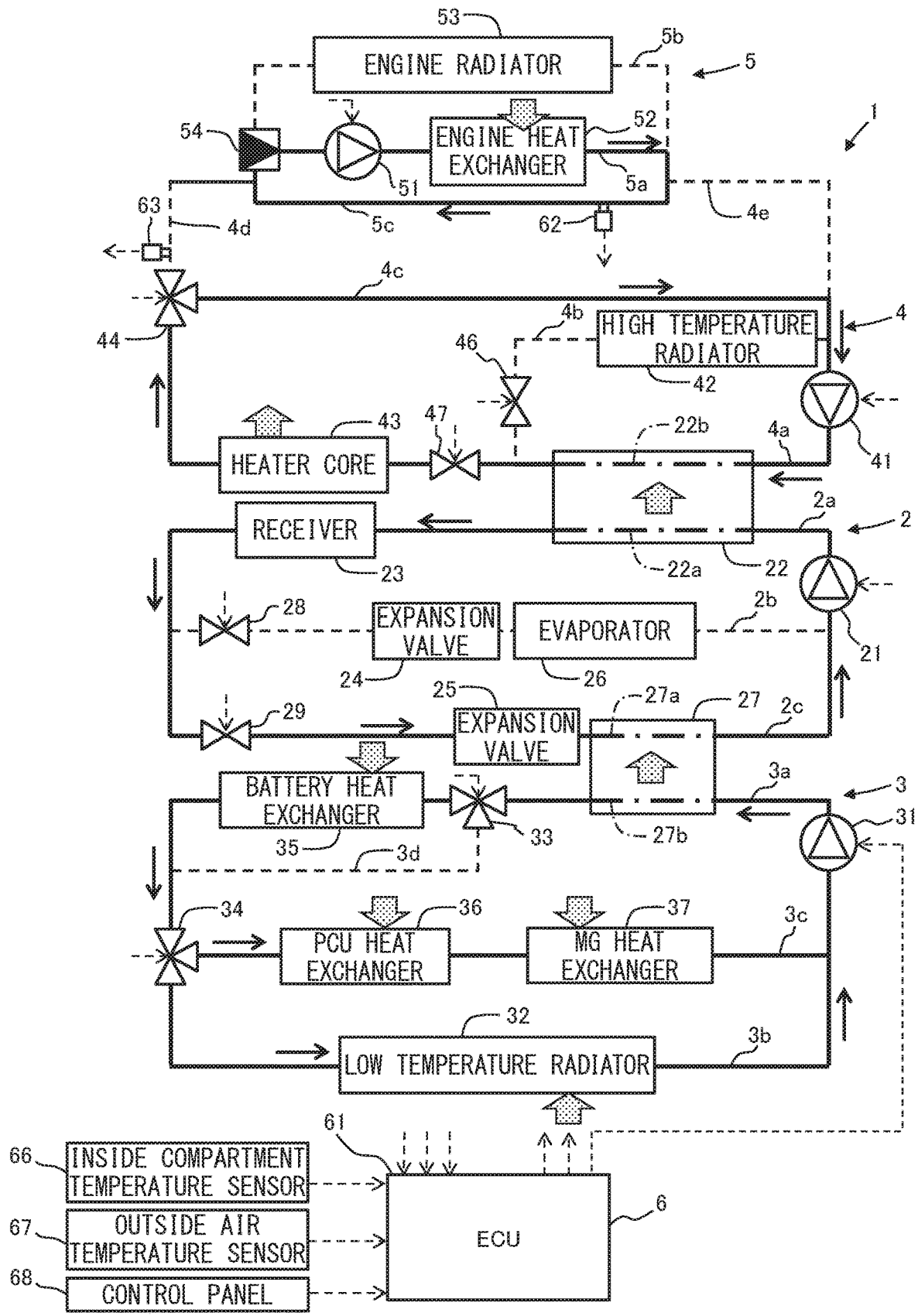
FIG. 11 shows a flow state of a heat medium in a vehicle-mounted temperature control system during a cold start of the internal combustion engine (third heating mode).

In the present embodiment, if cold start of the internal combustion engine 110 is started in the state where heating of the passenger compartment is demanded, the flow state of the heat medium of the vehicle-mounted temperature control system 1 is set to the third flow state (third heating mode). FIG. 11 shows the third flow state of the heat medium of the vehicle-mounted temperature control system 1.

As shown in FIG. 11, in the third heating mode, the third pump 51 is operated and the third three-way valve 44 is set to the first communication state. Therefore, the cooling water in the engine cooling circuit 5 circulates inside the engine cooling circuit 5 without flowing out to the engine outflow flow path 4e. For this reason, the cooling water flowing out from the engine heat exchanger 52 again flows into the engine heat exchanger 52 without flowing through the heater core 43 and basic circuit.

At this time, the temperature of the internal combustion engine 110 is low and accordingly the temperature of the cooling water inside the engine cooling circuit 5 is also low, therefore the thermostat 54 is closed. Therefore, cooling water does not circulate through the engine radiator flow path 5b, while cooling water does not flow to the engine radiator 53. Therefore, in the engine cooling circuit 5, the cooling water circulates through the engine basic flow path 5a and engine bypass flow path 5c. As a result, the temperature of the cooling water inside the engine cooling circuit 5 flowing through the engine heat exchanger 52 gradually rises.

Further, as shown in FIG. 11, in the third heating mode, in the same way as the fourth heating mode shown in FIG. 10, the compressor 21, first pump 31, and second pump 41 are made to operate. Further, in the third heating mode, in the same way as the fourth heating mode, the first solenoid regulating valve 28 is closed, the second solenoid regulating valve 29 is opened, and the fourth three-way valve 45 is set to the first communication state. As a result, in the third heating mode, heat is absorbed from the outside air at the low temperature radiator 32, and sometimes at the heat exchangers of the heat generating devices, the heat is absorbed from the heat generating devices, and that heat is discharged at the heater core 43.

Figure 12:
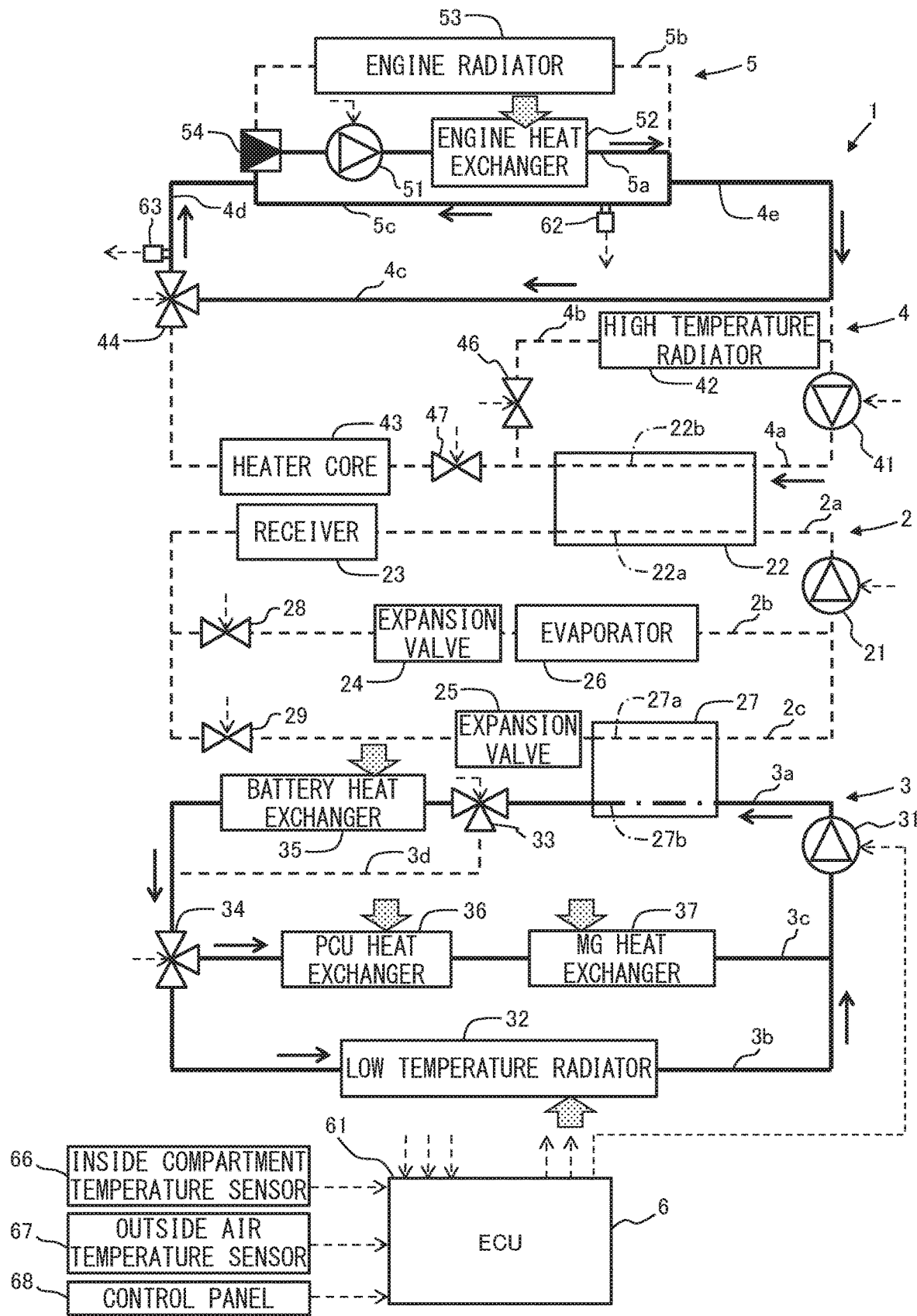
FIG. 12 shows a flow state of a heat medium in a vehicle-mounted temperature control system during a cold start of the internal combustion engine (second heating mode).

If the temperature of the cooling water inside the engine cooling circuit 5 flowing through the engine heat exchanger 52 rises and becomes equal to or greater than the first reference temperature, the flow state of the heat medium of the vehicle-mounted temperature control system 1 is set to the second flow state (second heating mode). FIG. 12 shows the second flow state of the heat medium of the vehicle-mounted temperature control system 1. Note that, the first reference temperature is, for example, a temperature a certain degree higher than the temperature where deterioration of the exhaust emission would become greater if lower than that temperature (for example, 40° C.), specifically for example 60° C.

Note that, the flow state of the heat medium shown in FIG. 11 is one example in the third heating mode. Therefore, as long as the cooling water heated at the condenser 22 flows through the heater core 43 and the cooling water circulates inside the engine cooling circuit 5, the flow state may be different from the flow state shown in FIG. 11. For example, in the third heating mode, in the low temperature circuit 3, the cooling water need not flow to the heat exchangers of some of the heat generating devices. Further, when heating and dehumidification of the passenger compartment are demanded, the refrigerant may also flow through the evaporator 26 in the refrigeration circuit 2.

As shown in FIG. 12, in the second heating mode, the third pump 51 is operated and the third three-way valve 44 is set to the second communication state. Therefore, part of the cooling water inside the engine cooling circuit 5 flows out to the engine outflow flow path 4e, then passes through the two-way flow path 4c and the engine inflow flow path 4d to again be returned to the engine cooling circuit 5. Therefore, in the second heating mode, part of the cooling water heated in the engine heat exchanger 52 passes through the two-way flow path 4c without passing through the heater core 43 (that is, passes through part of the basic circuit). In the second heating mode, the direction in which the cooling water flows through the two-way flow path 4c becomes opposite to the direction in which the cooling water flows through the two-way flow path 4c in the third heating mode.

At this time, the temperature of the internal combustion engine 110 is not that high and the temperature of the cooling water inside the engine cooling circuit 5 is also lower than the warmup reference temperature. For this reason, the thermostat 54 is closed and cooling water does not flow to the engine radiator flow path 5b. Therefore, in the second heating mode as well, in the same way as the third heating mode, in the engine cooling circuit 5, basically cooling water circulates through the engine basic flow path 5a and the engine bypass flow path 5c. In addition, in the second heating mode, some of the cooling water circulates through the engine outflow flow path 4e, two-way flow path 4c, and engine inflow flow path 4d. As a result, the temperature of the cooling water flow through the engine outflow flow path 4e, two-way flow path 4c, and engine inflow flow path 4d gradually rises.

Further, as shown in FIG. 12, in the second heating mode, the compressor 21 and the second pump 41 are stopped and the first pump 31 is made to operate. As a result, in the second heating mode, the cooling water in the low temperature circuit 3 circulates in the low temperature circuit 3 in the same way as the first stopping mode. Therefore, in the second heating mode, heat is absorbed from the heat generating device of the heat exchangers of the heat generating devices, and that heat is discharged at the low temperature radiator 32.

After that, if the temperature of the cooling water flowing through the engine inflow flow path 4*d* rises and becomes equal to or greater than the second reference temperature, the flow state of the heat medium of the vehicle-mounted temperature control system 1 is set to the first flow state (first heating mode) shown in FIG. 9. Here, after the internal combustion engine 110 finishes warming up, the heat is discharged from the internal combustion engine 110, therefore it is more efficient to utilize the heat discharged from the internal combustion engine 110 for heating, rather than utilizing the heat generated by driving the refrigeration circuit 2. For this reason, in the present embodiment, after the temperature of the cooling water flowing through the engine heat exchanger 52 becomes equal to or greater than the second reference temperature, the vehicle-mounted temperature control system 1 is made to operate in the first heating mode shown in FIG. 9. Note that, the second reference temperature is, for example, a temperature at which heating can be continued even if cooling water of that temperature flows into the heater core 43, specifically for example 60° C. The second reference temperature is, for example, set to equal to or greater than the temperature of the first reference temperature.

Note that, the flow state of the heat medium shown in FIG. 12 is one example in the second heating mode. Therefore, as long as part of the cooling water inside the engine cooling circuit 5 circulates through the engine outflow flow path 4*e*, two-way flow path 4*c*, and engine inflow flow path 4*d*, the flow state may be different from the flow state shown in FIG. 12. For example, in the third heating mode, at the low temperature circuit 3, the cooling water need not flow to the heat exchangers of some of the heat generating devices.

Figure 13:
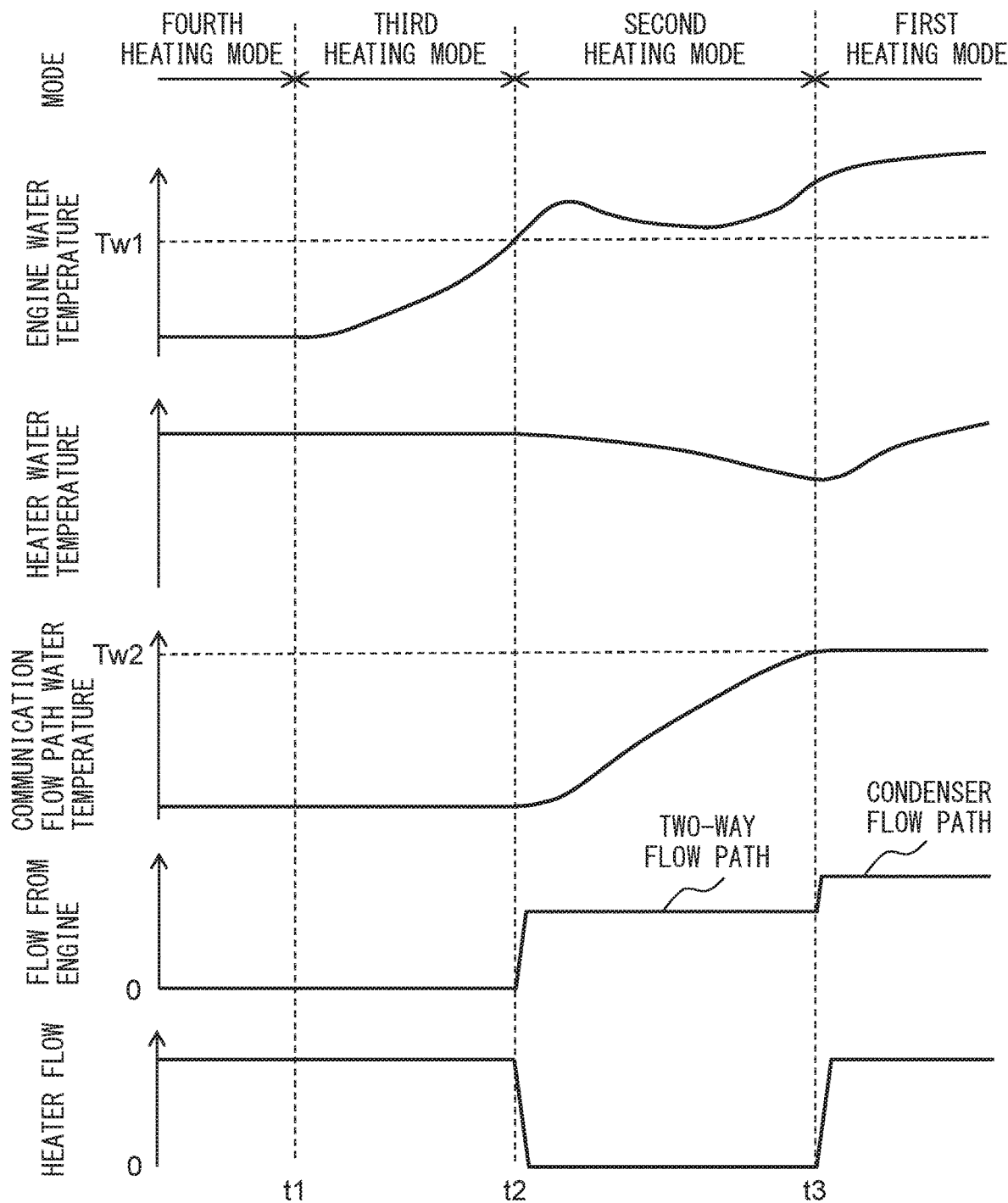
FIG. 13 is a time chart showing trends in various parameters when the internal combustion engine is cold started in the state where heating of the passenger compartment is demanded.

Time Chart FIG. 13 is a time chart showing trends in various parameters when the internal combustion engine 110 is cold started in the state where heating of the passenger compartment is demanded. The "engine water temperature" in the figure indicates the temperature of the cooling water circulating through the inside of the engine cooling circuit 5, the "heater water temperature" indicates the temperature of the cooling water flowing through the heater core 43, and the "communication flow path water temperature" indicates the temperature of the cooling water flowing through the engine inflow flow path 4*d*. Further, the flow from the engine in the figure indicates the flow rate of cooling water flowing out from the engine cooling circuit 5 through the engine outflow flow path 4*e*, while the heater flow indicates the flow rate of the cooling water flowing through the heater core 43.

In the example shown in FIG. 13, before cold start of the internal combustion engine 110 is started at the time t1, the vehicle-mounted temperature control system 1 is operated in the fourth heating mode (FIG. 10). Therefore, before the time t1, cooling water circulates through the condenser 22 and the heater core 43. Further, the cooling water heated at the condenser 22 flows into the heater core 43, therefore cooling water of a relatively high temperature flows therethrough.

In the example shown in FIG. 13, at the time t1, the internal combustion engine 110 is cold started and the flow state of the heat medium at the vehicle-mounted temperature control system 1 is switched to the third heating mode (FIG. 11). As a result, the temperature of the cooling water circulating through the engine cooling circuit 5 gradually rises. On the other hand, cooling water heated at the condenser 22 continues to flow into the heater core 43, therefore relatively high temperature cooling water flows therethrough.

After that, when, at the time t2, the temperature of the cooling water circulating through the inside of the engine cooling circuit 5 reaches the first reference temperature Tw1, the flow state of the heat medium at the vehicle-mounted temperature control system 1 is switched to the second heating mode (FIG. 12). Therefore, after the time t2, part of the cooling water inside the engine cooling circuit 5 flows through the engine outflow flow path 4*e*, two-way flow path 4*c*, and engine inflow flow path 4*d*. For this reason, the temperature of the cooling water flowing through the engine outflow flow path 4*e*, two-way flow path 4*c*, and engine inflow flow path 4*d* gradually rises. On the other hand, cooling water which had stagnated in the engine outflow flow path 4*e*, two-way flow path 4*c*, and engine inflow flow path 4*d* flows into the engine cooling circuit 5, therefore the temperature of the cooling water in the engine cooling circuit 5 temporarily falls. However, if the temperature of the cooling water flowing through the engine outflow flow path 4*e*, two-way flow path 4*c*, and engine inflow flow path 4*d* gradually rises, the temperature of the cooling water inside the engine cooling circuit 5 rises again after temporarily falling. On the other hand, cooling water no longer flows into the heater core 43, therefore the temperature of the cooling water inside the heater core 43 falls, though slightly. At this time, to keep the temperature of the cooling water inside the heater core 43 from falling, the blower motor 71*a* may also be made to stop.

Further, when, at the time t3, the temperature of the cooling water flowing through the engine inflow flow path 4*d* reaches the second reference temperature Tw2, the flow state of the heat medium of the vehicle-mounted temperature control system 1 is switched to the first heating mode (FIG. 9). Therefore, after the time t3, part of the high temperature cooling water inside the engine cooling circuit 5 flows through the condenser 22 and the heater core 43. Therefore, the temperature of the cooling water flowing through the heater core 43 again rises and finally is maintained at a relatively high constant temperature.

In this way, according to the vehicle-mounted temperature control system 1 according to the present embodiment, while the internal combustion engine 110 is being cold started in the state where heating of the vehicle is demanded, the temperature of the cooling water inside the heater core 43 is constantly maintained at a relatively high temperature.

Figure 14:
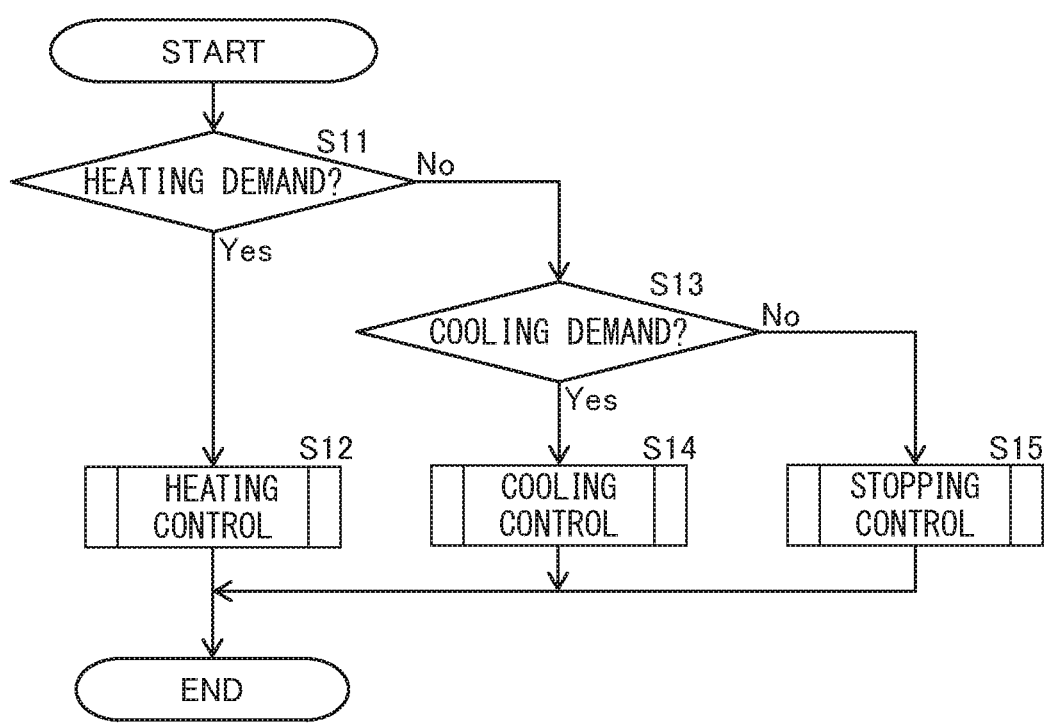
FIG. 14 is a flow chart of a control routine for control of the flow state of the heat medium in a vehicle-mounted temperature control system.

Flow Chart FIG. 14 is a flow chart of a control routine controlling the flow state of the heat medium in the vehicle-mounted temperature control system 1. The illustrated control routine is executed every certain time interval.

First, at step S11, the ECU 61 judges if heating has been demanded. If at step S11 it is judged that heating has been demanded, the control routine proceeds to step S12. At step S12, the heating control shown in FIG. 15 is executed.

On the other hand, if at step S11 it is judged that heating is not demanded, the control routine proceeds to step S13. At step S13, the ECU 61 judges if cooling has been demanded. If at step S13 it is judged that cooling has been demanded, the control routine proceeds to step S14. At step S14, cooling control is executed. In cooling control, for example, the flow state of the heat medium of the vehicle-mounted temperature control system 1 is set to either the first cooling mode or the second cooling mode in accordance with whether rapid cooling of the heat generating devices is required.

If at step S13 it is judged that cooling is not being demanded, the control routine proceeds to step S15. At step S15, stopping control is performed. In the stopping control, for example, the flow state of the heat medium in the vehicle-mounted temperature control system 1 is set to either the first stopping mode or the second stopping mode in accordance with whether rapid cooling of the heat generating devices is required.

Figure 15:
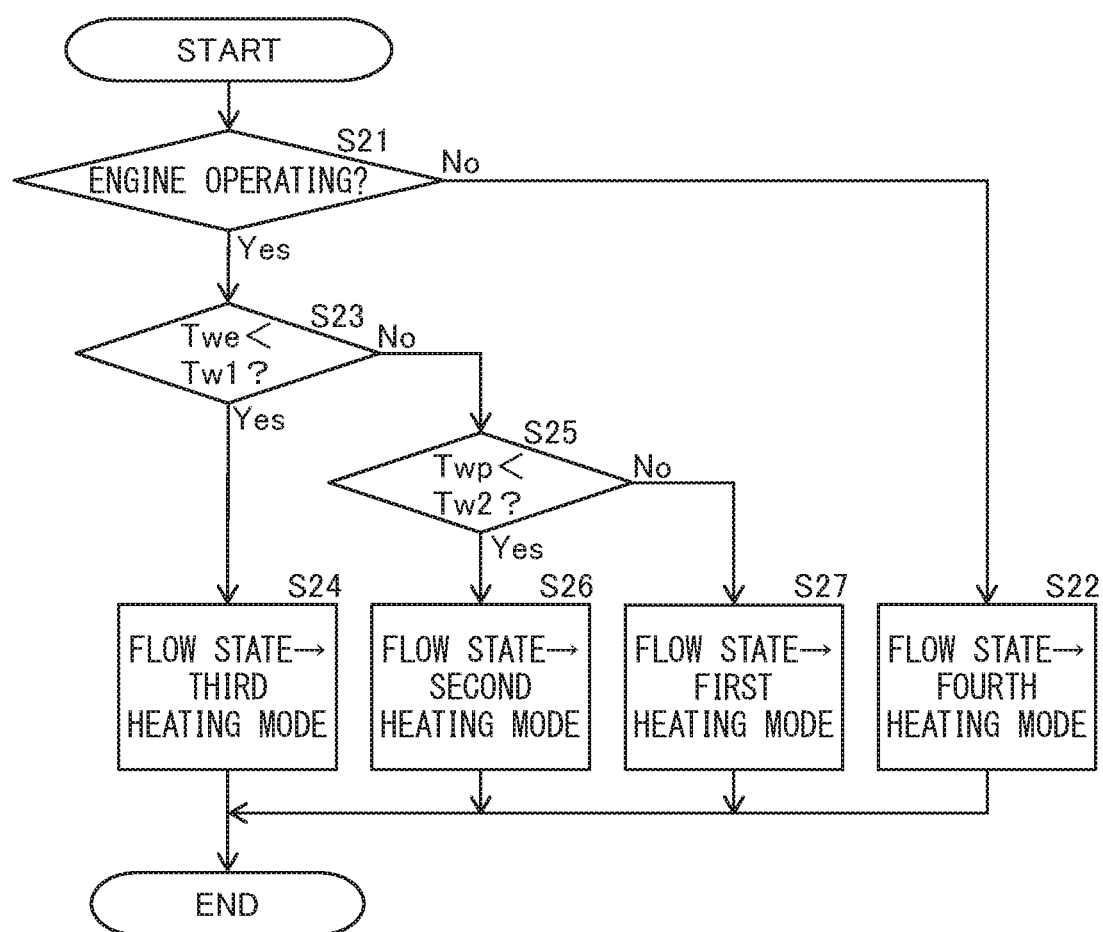
FIG. 15 is a flow chart of a control routine of heating control performed at step S12 of FIG. 14.

FIG. 15 is a flow chart showing a control routine of heating control performed at step S12 of FIG. 14. The control routine of FIG. 15 is performed each time the control routine of FIG. 14 reaches step S12.

First, at step S21, the ECU 61 judges if the internal combustion engine 110 is operating. Whether the internal combustion engine 110 is operating is, for example, judged based on the output of a sensor showing the rotational speed of the internal combustion engine 110, etc. If at step S21 it is judged that the internal combustion engine 110 is not operating, the control routine proceeds to step S22. At step S22, the ECU 61 sets the flow state of the heat medium at the vehicle-mounted temperature control system 1 to the fourth heating mode (FIG. 10).

On the other hand, if at step S21 it is judged that the internal combustion engine 110 is operating, the control routine proceeds to step S23. At step S23, the ECU 61 judges if the temperature Twe of the cooling water in the engine cooling circuit 5 detected by the first water temperature sensor 62 is less than the first reference temperature Tw1. If at step S23 it is judged that the temperature Twe of the cooling water inside the engine cooling circuit 5 is less than the first reference temperature Tw1, the control routine proceeds to step S24. At step S24, the ECU 61 sets the flow state of the heat medium in the vehicle-mounted temperature control system 1 to a third heating mode (FIG. 11).

On the other hand, if at step S23 it is judged that the temperature Twe of the cooling water inside the engine cooling circuit 5 is equal to or greater than the first reference temperature Tw1, the control routine proceeds to step S25. At step S25, the ECU 61 judges if the temperature Twp of the cooling water inside the engine inflow flow path 4*d* detected by the second water temperature sensor 63 is less than the second reference temperature Tw2.

If at step S25 it is judged if the temperature Twp of the cooling water inside the engine inflow flow path 4*d* is less than the second reference temperature Tw2, the control routine proceeds to step S26. At step S26, the ECU 61 sets the flow state of the heat medium in the vehicle-mounted temperature control system 1 to the second heating mode (FIG. 12).

On the other hand, if at step S25 it is judged that the temperature Twp of the cooling water inside of the engine inflow flow path 4*d* is equal to or greater than the second reference temperature Tw2, the control routine proceeds to step S27. At step S27, the ECU 61 sets the flow state of the heat medium in the vehicle-mounted temperature control system 1 to the first heating mode (FIG. 9).

Note that, in the above embodiment, the flow state of the cooling water in the high temperature circuit 4 is switched based on the temperature of the cooling water inside the engine cooling circuit 5 and the temperature of the cooling water inside the engine inflow flow path 4*d*. However, if, during cold start of the internal combustion engine, the flow state of the cooling water is switched in order of the third heating mode, the second heating mode, and the first heating mode, the flow state may also be switched based on other conditions. Therefore, for example, the flow state may also be switched based on the time elapsed from switching the flow state the previous time. In this case, for example, if the elapsed time from which switching the flow state from the third heating mode to the second heating mode reaches a predetermined constant time, the flow state is switched from the second heating mode to the first heating mode.

Advantageous Effects

In this regard, in the vehicle-mounted temperature control system 1 of the present embodiment, the engine inflow flow path 4*d* and engine outflow flow path 4*e* extend between the front and rear of the passenger compartment. Further, at the time of cold start of the internal combustion engine 110, first the cooling water is circulated through the inside of the engine cooling circuit 5 to rise the temperature of the cooling water inside the engine cooling circuit 5 to a certain degree of temperature. Therefore, even if the temperature of the cooling water inside the engine cooling circuit 5 becomes high to a certain extent, the temperature of the cooling water of the engine inflow flow path 4*d* and engine outflow flow path 4*e* may sometimes remain low.

If, in this state, cooling water flows from the engine cooling circuit 5 to the heater core 43, the low temperature cooling water which had remained in the engine inflow flow path 4*d* and engine outflow flow path 4*e* flows into the heater core 43. Therefore, for example, if utilizing the condenser 22 of the refrigeration circuit 2 in advance to raise the temperature of the cooling water flowing into the heater core 43, the temperature of the cooling water flowing through the heater core 43 temporarily falls. As a result, the heating capability by the heater core 43 temporarily falls.

As opposed to this, in the vehicle-mounted temperature control system 1 according to the present embodiment, the flow state of the heat medium is set to the second heating mode (FIG. 12), then is set to the first heating mode (FIG. 9). That is, the cooling water inside the engine cooling circuit 5 flows through the two-way flow path 4*c* forming part of the basic circuit positioned at the front of the vehicle before flowing through the condenser flow path 4*a* (that is, before flowing through the heater core 43). As a result, after the cooling water inside the engine inflow flow path 4*d* and engine outflow flow path 4*e* is sufficiently warmed, the cooling water inside the engine cooling circuit 5 flows into the heater core 43. For this reason, according to the vehicle-mounted temperature control system 1 according to the present embodiment, while the internal combustion engine 110 is being cold started in the state in which heating of the passenger compartment is demanded, the temperature of the cooling water in the heater core 43 is constantly maintained at a relatively high temperature. Therefore, the temperature of the cooling water flowing through the heater core 43 is kept from temporarily falling.

Modifications

Note that, in the above, the case when the internal combustion engine 110 is cold started in the state where heating of the passenger compartment is demanded, is taken as an example for the explanation. However, even when heating of the passenger compartment is first demanded after the internal combustion engine 110 finishes being warmed up, the temperature of the cooling water inside the engine inflow flow path 4*d* and engine outflow flow path 4*e* may remain low. Therefore, in such a case as well, as explained above, the flow state of the heat medium may be set to the second heating mode and the first heating mode in that order. Therefore, summarizing these, if heating of the passenger compartment is demanded in the state where the temperature of the cooling water of the engine inflow flow path 4*d* and engine outflow flow path 4*e* is lower than the temperature required for heating, the flow state of the heat medium is set to the second heating mode and the first heating mode in that order.

Further, in the above embodiment, the engine heat exchanger 52 and the engine cooling circuit 5 are arranged at the rear of the vehicle 100, while the basic circuit provided with the condenser 22 and the heater core 43 is arranged at the front of the vehicle. However, the engine heat exchanger 52 and the engine cooling circuit 5 may be arranged at the front of the vehicle 100, while the condenser 22, heater core 43, and bypass flow path 4f may be arranged at the rear of the vehicle. Therefore, the engine heat exchanger 52 is arranged at a first side of the passenger compartment in the longitudinal direction of the vehicle 100, while the basic circuit provided with the condenser 22 and the heater core 43 is arranged at a second side at the opposite side to the first side in the longitudinal direction of the vehicle 100.

Further, in the above embodiment, the condenser 22 is provided as the second heating part utilizing heat other than the exhaust heat of the internal combustion engine 110 to heat the cooling water of the high temperature circuit 4. However, a heating means other than the condenser 22 may be provided as the second heating part. Specifically, the second heating part may be, for example, an electric heater.

In addition, the high temperature circuit 4 may have a configuration different from the configuration in the above embodiment. However, even in this case, the high temperature circuit 4 has to be provided with a heat circuit provided with a heater core 43 and a cooling water piping 22b of the condenser 22 in the flow path, a communication flow path making the engine heat exchanger 52 communicate with this heat circuit, and a connection state switching mechanism switching the flow state of the heat medium between a first flow state and a second flow state, and the control device has to be able to control the connection state switching mechanism. Further, in the first flow state, at least part of the heat medium heated by the engine heat exchanger 52 flows through the heater core 43 while flowing through part of the heat circuit. In the second flow state, at least part of the heat medium heated by the engine heat exchanger 52 flows through part of the heat circuit without flowing through the heater core 43.

Figure 16:
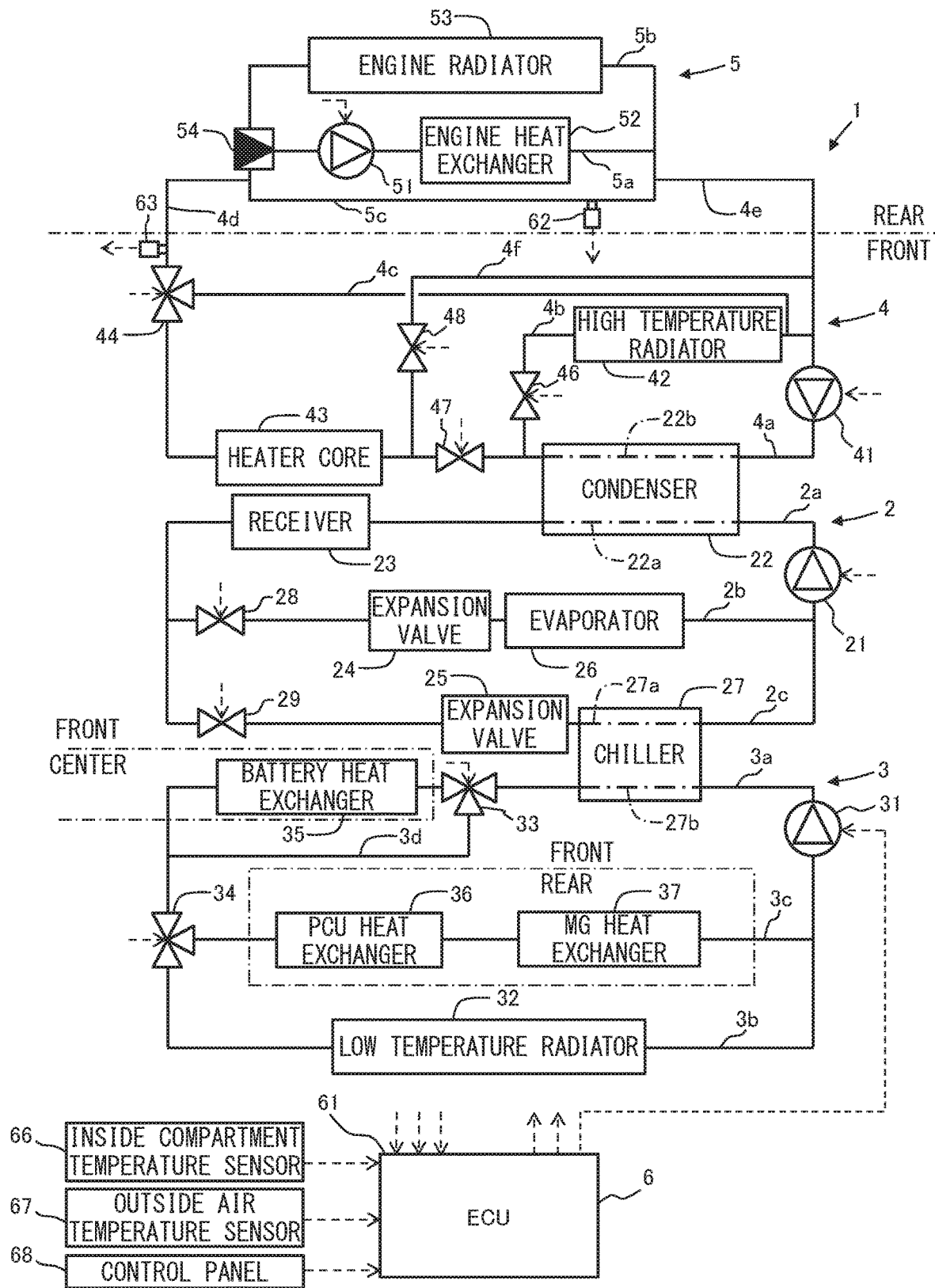
FIG. 16 is a schematic view of the configuration of a vehicle-mounted temperature control system showing an example of a high temperature circuit having a different configuration.

FIG. 16 shows an example of a high temperature circuit 4 having a configuration different from the above embodiment. In the example shown in FIG. 16, one end part of the two-way flow path 4c communicates with not the condenser flow path 4a, but the high temperature radiator flow path 4b. Further, one end part of the high temperature radiator flow path 4b connects the condenser flow path 4a and engine outflow flow path 4e. In addition, in the example shown in FIG. 16, a bypass flow path 4f connecting the engine outflow flow path 4e and the condenser flow path 4a is provided. The bypass flow path 4f communicates with the condenser flow path 4a between the fourth solenoid regulating valve 47 and the heater core 43. The bypass flow path 4f is provided with a fifth solenoid regulating valve 48 controlling the flow rate of cooling water flowing through the bypass flow path 4f.

Above, preferred embodiments according to the present invention were explained, but the present invention is not limited to these embodiments and can be corrected and changed in various ways within the language of the claims.

The invention claimed is:

1. A vehicle-mounted temperature control system comprising:
 a heater core configured to use heat of a heat medium to heat an inside of a passenger compartment of a vehicle;
 a first heat exchanger utilizing exhaust heat of an internal combustion engine to heat the heat medium flowing through an engine cooling circuit, which includes the first heat exchanger;
 a second heat exchanger utilizing heat other than exhaust heat of the internal combustion engine to heat the heat medium;
 a heat circuit provided with, in heat medium flow sequence, the second heat exchanger, a regulating valve, and the heater core inside a first flow path;
 a communication flow path by which the engine cooling circuit communicates with the heat circuit;
 a connection state switching valve switching a flow state between the heater core and the first heat exchanger and the second heat exchanger, among a first flow state, a second flow state, and a third flow state; and
 a control device controlling the connection state switching valve such that:
 (i) in the first flow state, at least part of the heat medium heated by the first heat exchanger flows from the engine cooling circuit, through part of the heat circuit while flowing through the heater core, and returns to the engine cooling circuit,
 (ii) in the second flow state, a part of the heat medium heated by the first heat exchanger flows from the engine cooling circuit, through part of the heat circuit without flowing through the heater core, and returns to the engine cooling circuit, and a remainder of the heat medium heated by the first heat exchanger continues to flow in the engine cooling circuit and does not flow through the heat circuit, and
 (iii) in the third flow state, the heat medium does not flow from the first heat exchanger to the heat circuit, and inside the heat circuit, the heat medium heated by the second heat exchanger flows through the heater core, and
 the control device controls the connection state switching valve so as to switch the flow state of the heat medium to the third flow state, the second flow state, and the first flow state in that order when the heating of the passenger compartment is demanded.

2. The vehicle-mounted temperature control system according to claim 1, wherein the control device controls the connection state switching valve so as to switch the flow state of the heat medium in sequence from the second flow state to the first flow state, when heating the passenger compartment.

3. The vehicle-mounted temperature control system according to claim 1, wherein a direction in which the heat medium heated by the second heat exchanger flows through a second flow path of the heat circuit when the flow state is the third flow state and a direction in which the heat medium heated by the first heat exchanger flows through the second flow path of the heat circuit when the flow state is the second flow state are opposite.

4. The vehicle-mounted temperature control system according to claim 1, wherein
 in the third flow state, the heat medium heated by the first heat exchanger flows through only the inside of the engine cooling circuit.

5. The vehicle-mounted temperature control system according to claim 1, further comprising a refrigeration circuit, wherein
 the second heat exchanger utilizes the heat of a condenser of the refrigeration circuit to heat the heat medium.

6. The vehicle-mounted temperature control system according to claim 1, wherein the heat circuit includes a radiator provided alongside the heater core with respect to the second heat exchanger, and the radiator is configured to adjust the flow rate of the heat medium flowing through the heater core and the radiator.

7. The vehicle-mounted temperature control system according to claim 1, wherein
the heat circuit is arranged at a first side of the passenger compartment in a longitudinal direction of the vehicle, and the first heat exchanger is arranged at a second side, which is the opposite side from the first side, in the longitudinal direction of the vehicle.

8. The vehicle-mounted temperature control system according to claim 7, wherein the first side of the passenger compartment is a rear side of the passenger compartment, and the second side of the passenger compartment is a front side of the passenger compartment.

* * * * *